United States Patent [19]

Nakamura

[11] Patent Number: 5,758,108
[45] Date of Patent: May 26, 1998

[54] DATA PROCESSING APPARATUS FOR VARIABLE BUS WIDTH CPU

[75] Inventor: Akiyoshi Nakamura, Nagano-ken, Japan

[73] Assignee: Seiko Epson Corporation, Tokyo, Japan

[21] Appl. No.: 562,347

[22] Filed: Nov. 22, 1995

[30] Foreign Application Priority Data

Nov. 22, 1994 [JP] Japan ..................... 6-312539

[51] Int. Cl.$^6$ ............... G06F 15/76; G06F 13/00
[52] U.S. Cl. ............................ 395/307; 395/309
[58] Field of Search ..................... 395/307, 308, 395/309, 800, 500, 750; 364/492

[56] References Cited

U.S. PATENT DOCUMENTS

| | | | |
|---|---|---|---|
| 4,950,921 | 8/1990 | Takada | 307/296.1 |
| 5,325,490 | 6/1994 | Brasseur | 395/309 |
| 5,345,112 | 9/1994 | Nazarian et al. | 307/443 |
| 5,473,766 | 12/1995 | Shaver | 395/500 |
| 5,548,766 | 8/1996 | Kaneko et al. | 395/307 |
| 5,551,012 | 8/1996 | Chuang et al. | 395/500 |

*Primary Examiner*—Gopal C. Ray
*Attorney, Agent, or Firm*—Loeb & Loeb LLP

[57] ABSTRACT

A data processing apparatus in which the CPU can have different data bus widths is described. A variable power source is provided to supply a proper voltage to an installed CPU, and a CPU module has a feedback resistor that is connected to feedback terminals of the CPU module. By changing the resistance value of the feedback resistor in each CPU module, a proper output voltage can be provided to the installed CPU. The CPU module is provided with a terminal that generates a module determination signal used for making a determination of a module of the installed CPU module. Expanded RAM is provided with a terminal that generates a memory determination signal used for making a determination as to whether or not a memory is expanded. A memory controller and a bus control section perform a bus control function appropriate to the installed CPU and the installed memory in accordance with the module determination signal and the memory determination signal.

36 Claims, 25 Drawing Sheets

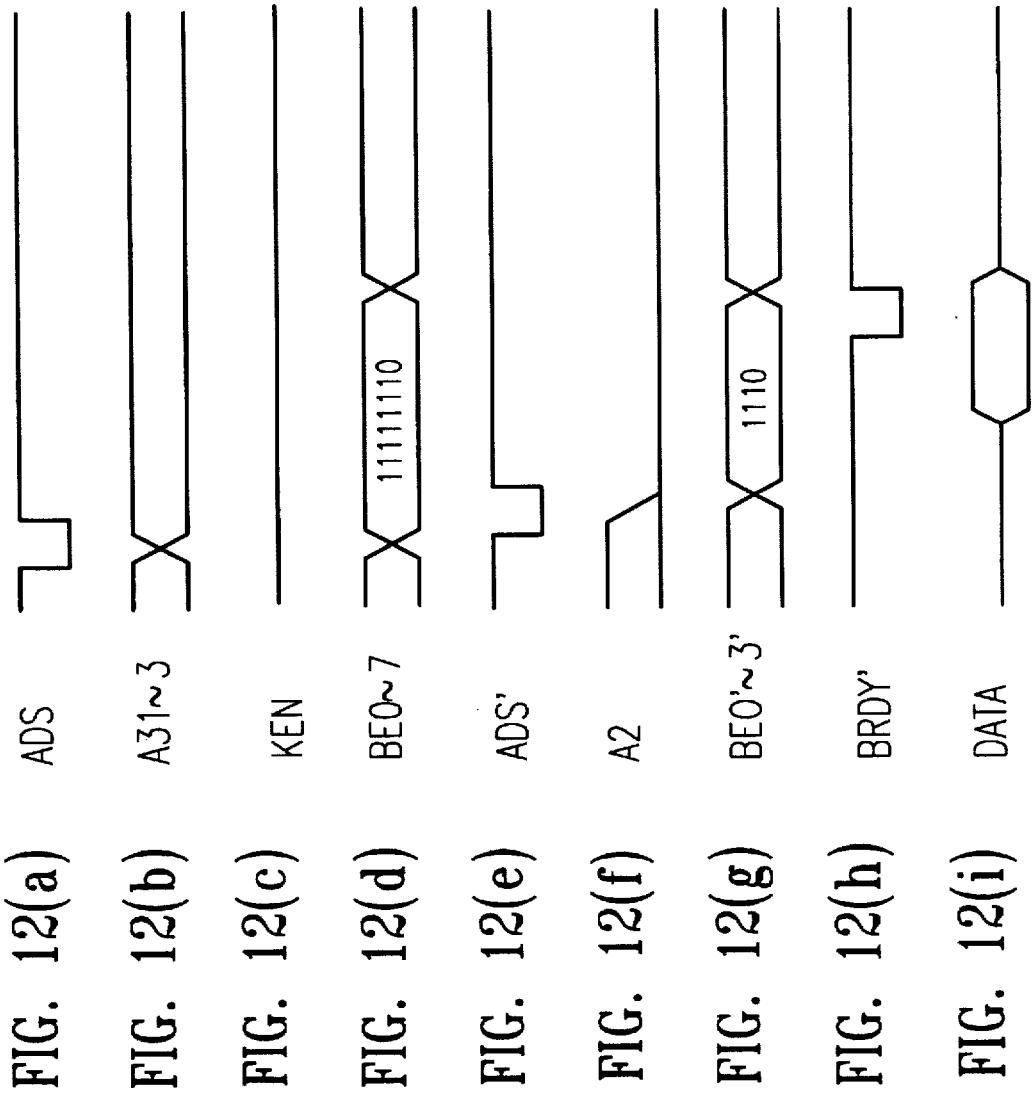

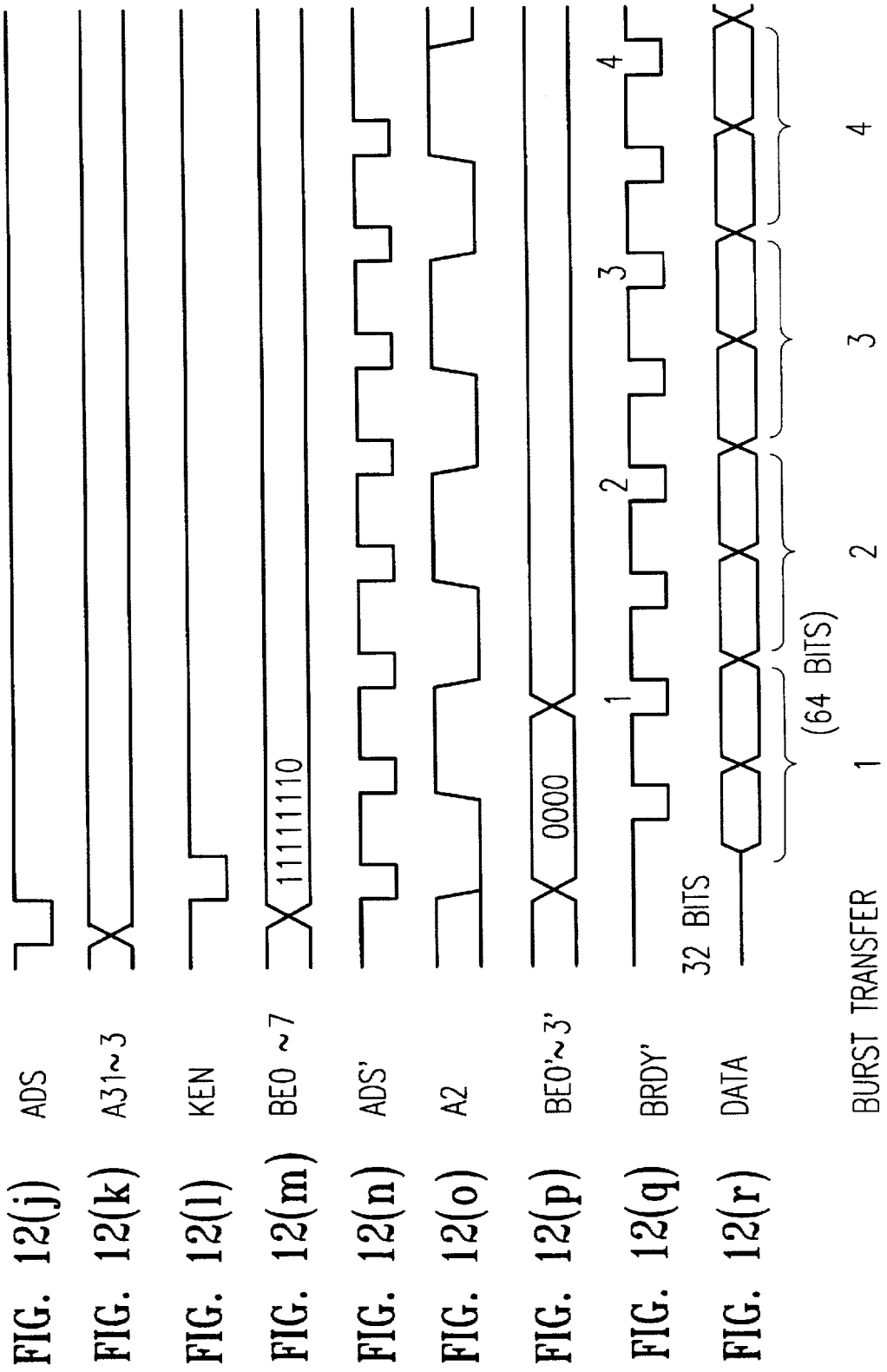

DATA PROCESSING APPARATUS FOR VARIABLE BUS WIDTH CPU

BACKGROUND OF THE INVENTION

1. Field of the Invention

The present invention relates to a data processing apparatus in which a plurality of CPU modules having different data bus widths are exchangeable with each other.

2. Prior Art

In recent years, the development of microprocessors for CPUs used for data processing applications has been pursued at an accelerated rate. As a result, microprocessors having higher performances have been successively released in the market. There are data processing systems capable of replacing an originally installed CPU with a new CPU having higher performance. In such data processing systems, the original CPU can be replaced with a CPU operating at a greater clock frequency so that the processing speed is increased by the CPU replacement.

Not only microprocessors having different clock frequencies, but microprocessors with a greater bus width that are operable at a greater speed and have a higher performance have been developed to replace the original CPU.

However, when a new CPU having a different data bus is selected and installed, there are instances in which the bus width of the new CPU and the bus width of the CPU originally installed in the computer are different. As a result, there are problems in which the CPU can not appropriately perform data transfer.

Furthermore, when the data bus width and the clock frequency are increased to improve the processing power of the CPU, the power consumption and accordingly the heat generation increase. To prevent the increase in the power consumption caused as a result of a higher processing power, there are types of CPUs which set a supply voltage to a part of the CPU circuit at a low level. However, the level of the voltage supplied to the CPU is not consistent, and may vary depending upon the types of CPUs. Accordingly, when a CPU having a different data bus width or a clock frequency is installed, a power source that provides a voltage level proper to the CPU must be installed with the CPU.

Various problems described above occur if a CPU is replaced with a CPU having a different data bus width. Therefore, there has not been a data processing apparatus in which CPUs having different data bus widths can be selected and installed for operation.

SUMMARY

It is an object of the present invention to solve the above mentioned problems in the prior art and to provide a data processing apparatus in which CPUs having different data bus widths can be selected and installed for operation.

To achieve the objects described above, there is provided a data processing apparatus in which one of a first CPU module having a first data bus width and a second CPU module having a second data bus width that is wider than the first data bus width may be selected and installed. The data processing apparatus includes: a first group of terminals that is commonly usable for the first CPU module and the second CPU module; a second group of terminals that is connected to a bus of the second CPU module; a variable power source that adjusts an output voltage to be supplied to an installed CPU module through at least one of the first and the second group of terminals; and a voltage adjusting device connected to the variable power source that adjusts the output voltage of the variable power source in response to the installed CPU module.

It should be noted that the terms "CPU module" used throughout the present specification are not limited to a module having a CPU chip mounted on a printed circuit board, but also includes a single CPU chip itself.

As a result, an output voltage of the variable power source is adjusted by the voltage adjusting device in accordance with the installed CPU module. Accordingly, a voltage compatible with the installed CPU module is supplied.

Another embodiment further includes a third group of terminals that is connected to a bus of the first CPU module, and a constant voltage power source that supplies a specified voltage to peripheral circuits of the installed CPU through the first group of terminals and supplies the specified voltage to a CPU core section of the first CPU module through the third group of terminals, wherein the variable power source supplies an output voltage to a CPU core section of the second CPU module through the second group of terminals.

As a result, where the CPU core section requires a different voltage supply, such a different voltage is readily supplied. In accordance with this embodiment, the voltage adjusting device has a circuit that couples a feedback resistor provided in the CPU module to a feedback terminal of the variable power source.

In another embodiment, the voltage adjusting device includes: a plurality of feedback resistors; a switch that selects and connects one of the plurality of feedback resistors to the feedback terminal of the variable power source; and a switch driving device that connects one of the plurality of feedback resistors to the feedback terminal by manipulating the switch in response to a signal provided by the installed CPU module. The value of the feedback resistor that is connected to the terminal of the variable power source is changed. As a result, the output voltage is adjusted according to the installed CPU module.

In another embodiment, one of a first CPU module having a first data bus width and a second CPU module having a second data bus width that is wider than the first data bus width may be selected and installed. The data processing apparatus includes: a first group of terminals that is commonly usable for the first CPU module and the second CPU module; a second group of terminals that is connected to a bus of the second CPU module; a processor data bus having a bus width that is the same as the second data bus width, and that is connected to an installed CPU through at least the second group of terminals; a module determination signal generating device that generates a module determination signal representing which one of the first CPU module and the second CPU module is installed; a lower address conversion device that converts a lower address outputted from the second CPU module, the lower address representing which bytes are effective on the processor data bus, into a signal equivalent to a lower address to be outputted from the first CPU module; and a selection device that selects one of a lower address outputted from an installed CPU module and a lower address outputted from the lower address conversion device in response to the module determination signal.

CPUs having different bus widths have different structures of the lower address indicating which bytes on the data bus are effective. In this connection, the lower address conversion device converts a lower address outputted from the second CPU module to a signal equivalent to a lower address outputted from the first CPU module. The selection device selects one of the lower address outputted from the installed CPU module and the lower address outputted from the lower address conversion device in response to the module determination signal. As a result, a lower address that is proper to the installed CPU module is generated.

In another embodiment, in which one of a first CPU module having a first data bus width and a second CPU module having a second data bus width that is wider than the first data bus width may be selected and installed. The data processing apparatus includes: a first group of terminals that is commonly usable for the first CPU module and the second CPU module; a second group of terminals that is connected to a bus of the second CPU module; a processor data bus having a bus width that is the same as the second data bus width, and that is connected to a data bus of an installed CPU through at least the second group of terminals; a module determination signal generating device that generates a module determination signal representing which one of the first CPU module and the second CPU module is installed; an input-output data bus having a data bus width that is the same as the first data bus width; and an input-output bus conversion device that is interposed between the processor data bus and the input-output data bus, and that performs a bus conversion between the data bus of the installed CPU module and the input-output data bus in response to the module determination signal. The input-output bus conversion device includes: an output conversion device that, when the first CPU module is installed, outputs all data on the data bus of the first CPU module to the input-output data bus, and that, when the second CPU module is installed, outputs data on the data bus of the second CPU module in a plurality of time intervals to the input-output data bus by sequentially selecting the data bus of the second CPU module one part by one part, and outputting selected data on the bus line to the input-output data bus; and an input conversion device that, when the first CPU module is installed, inputs all data on the input-output data bus to the data bus of the first CPU module, and that, when the second CPU module is installed, maintains a plurality of sets of data inputted in the plurality of times to the input-output data bus and simultaneously outputs the plurality of sets of data to the data bus of the second CPU module.

The input-output bus conversion device performs a bus conversion in a mode appropriate to the installed CPU module between the processor data bus and the input-output data bus in response to the module determination signal.

In another embodiment, the output conversion device includes a swap circuit that outputs, in response to a lower address representing effective bus lines on the processor data bus, data on the effective bus lines to the input-output data bus, and the input conversion device includes a plurality of latch circuits that maintain the corresponding plurality of sets of data inputted in the plurality of times to the input-output data bus. The memory bus conversion device performs a bus conversion, in a mode appropriate to the installed CPU module and the installed memory, between the processor data bus and the memory data bus in response to the module determination signal and the memory determination signal.

In another embodiment, the output conversion device includes a swap circuit that outputs, in response to a lower address representing effective bus lines on the processor data bus, data on the effective bus lines to the memory data bus, and the input conversion device includes a plurality of latch circuits that maintain the corresponding plurality of sets of data inputted in the plurality of times to the memory data bus.

In another embodiment, the module determination signal generating device has a module determination terminal that switches the level of the module determination signal in response to the connection state of the second group of terminals. As a result, an operation appropriate to the installed CPU module is executed in accordance with the connection state of the second group of terminals.

In another embodiment, the second data bus width is twice as wide as the first data bus width.

BRIEF DESCRIPTION OF THE FIGURES

FIGS. 12(a)–(i) show a timing chart of a bus cycle in which data is read from a memory that is connected to an input-output bus 400 to a 64-bit CPU 124.

DETAILED DESCRIPTION

A. Method of Installing CPU Module

Figure 1:
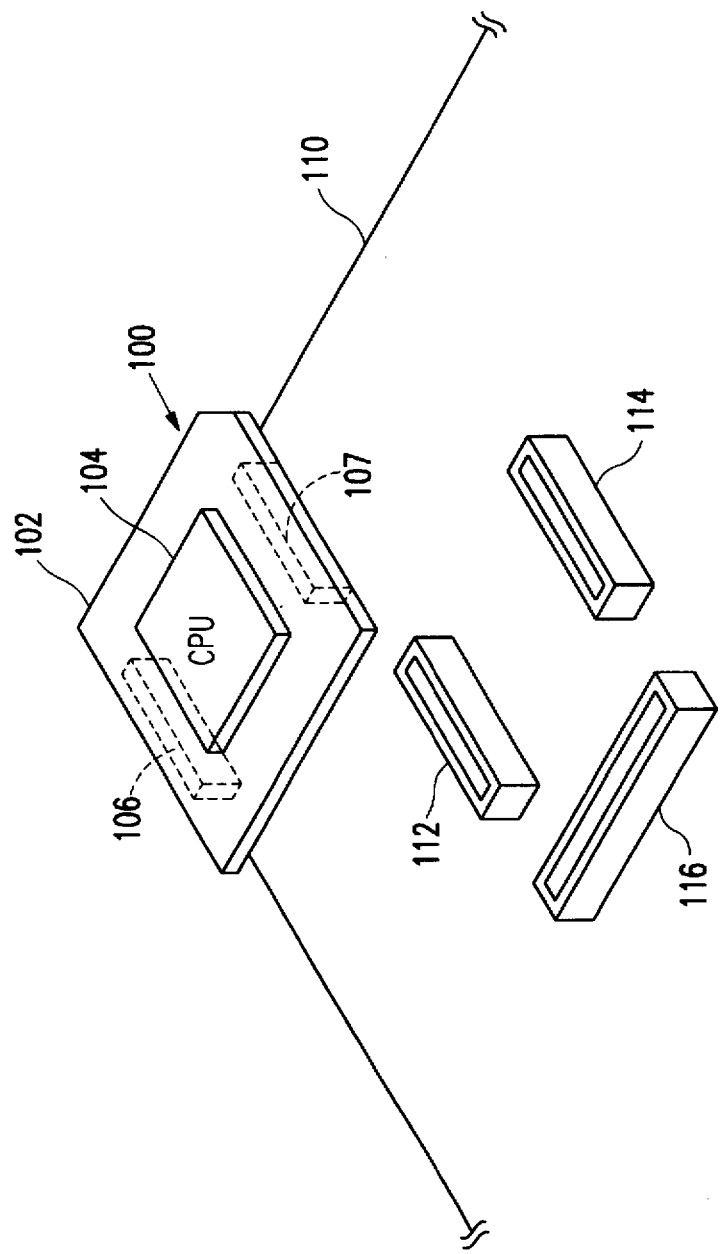
FIG. 1 shows a perspective view of a first CPU module to be installed in a personal computer in accordance with an embodiment of the present invention.

FIG. 1 shows a perspective view of a first CPU module to be installed in a personal computer in accordance with an embodiment of the present invention. A first CPU module 100 has a printed circuit board 102, a first CPU 104 provided on the upper surface of the printed circuit board 102, and two connectors 106 and 107 provided on the lower surface of the printed circuit board 102. The first CPU 104 has a 32-bit data bus width.

A system board 110, a printed circuit board that installs primary circuits of the personal computer has connectors 112 and 114 (first connectors) that engage the two connectors 106 and 107 of the first CPU module 100, respectively, and a connector 116 (a second connector) that engages a second CPU module which is described later.

Figure 2:
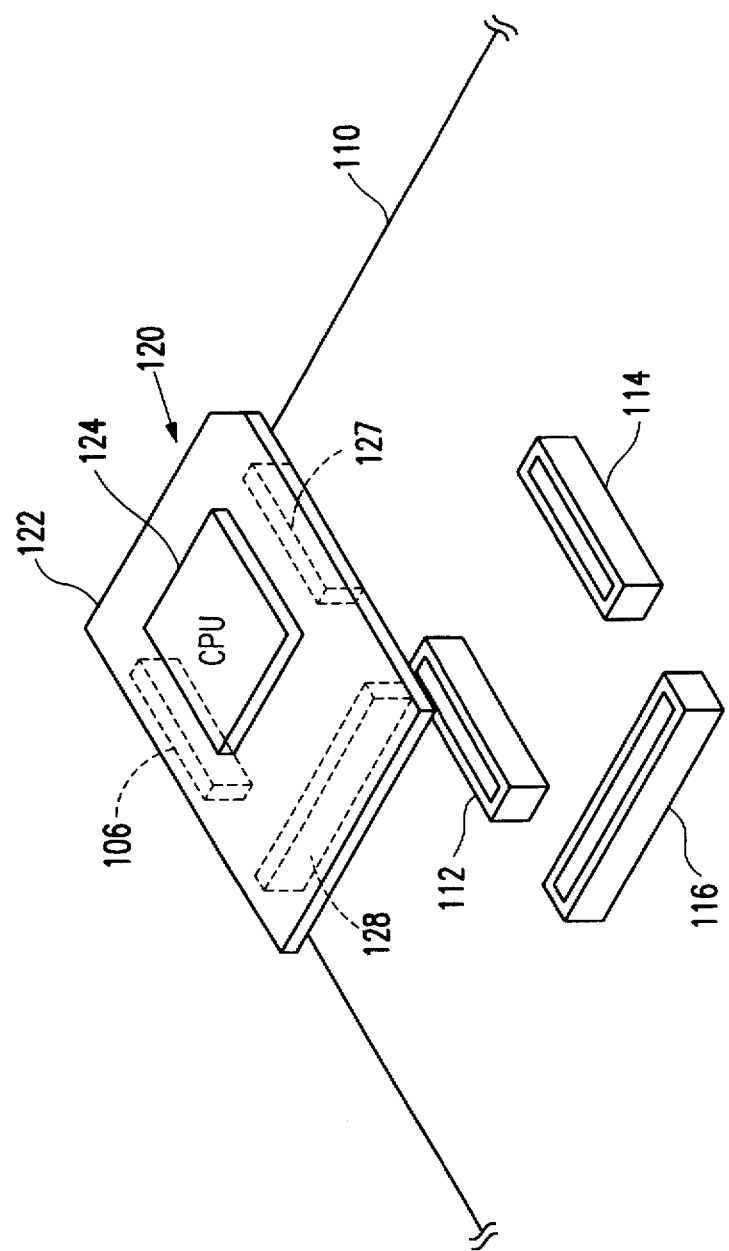
FIG. 2 shows a perspective view of a second CPU module.

FIG. 2 is a perspective view of a second CPU module. A second CPU module 120 has a printed circuit board 122, a second CPU 124 having a 64-bit data bus width, three connectors 126, 127 and 128 provided on the lower surface of the printed circuit board 122. These connectors 126, 127 and 128 engage the three connectors 112, 114 and 116 of the system board 110, respectively.

As shown in FIGS. 1 and 2, the first CPU module 100 is connected in a removable fashion to the connectors 112 and 114 provided on the system board 110, and the second CPU module 120 are connected in a removable fashion to the connectors 112, 114 and 116. Therefore, a user can exchange the first CPU module 100 with the second CPU module 120 at any time according to the requirements.

Preferably, the second CPU 124 is capable of running software that are executable on the first CPU 104. Namely, it should preferably be a software-compatible with the first CPU 104. The first CPU 104 may include, for example, i486 (Trademark of Intel), and the second CPU 124 may include, for example, Pentium (Trademark of Intel).

Figure 3A:
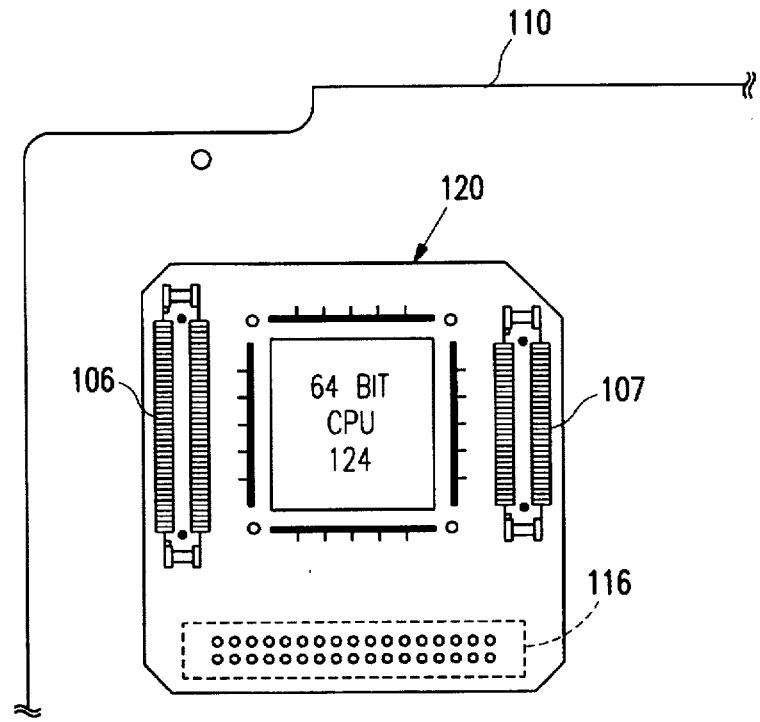
FIGS. 3(A), 3(B) and 3(C) show a plan view of a second CPU module 120 that is installed.
Figure 3B:
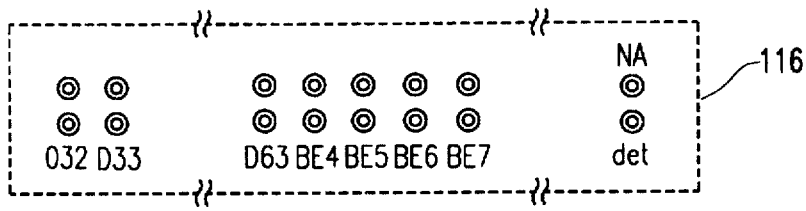

FIG. 3 is a plan view illustrating a status in which the second CPU module 120 is installed. FIG. 3(B) is a view used for explaining an arrangement of terminals of the connector 116. The connector 116 includes terminals that are required for signals of the second CPU 124 (for example, terminals D32–D63 for the upper 32 bits in the 64-bit data bus), but that are not provided on the first CPU 104. Also, a module determination terminal det is provided for determining the type of the installed CPU module. It should be noted that terminals and signals inputted in or outputted from the terminals are called by the same reference numerals throughout the present application.

Figure 3C:
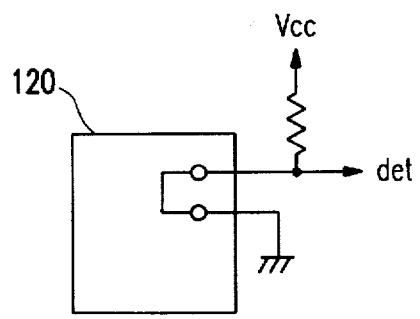

FIG. 3(C) shows a circuit structure in which the module determination terminal det outputs a determination signal det for determining the installed CPU module. When the second CPU module 120 is installed, the module determination terminal det is grounded so that the module determination signal det assumes a level "0" level. On the other hand, when the first CPU module 100 is installed, the module determination terminal det is opened. As a result, the module determination signal det assumes a level "1". Accordingly, by checking the level of the module determination signal det, a determination can be made as to which one of the first CPU module and the second CPU module is installed.

B. Method of Supplying Voltage Proper to CPU Module

Figure 4:
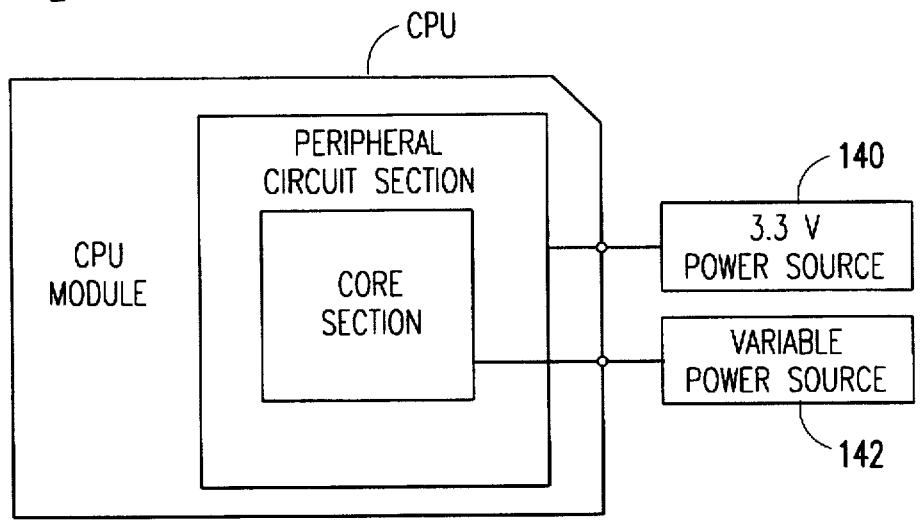
FIG. 4 shows a schematic view in which two power sources 140 and 142 are connected to a CPU module.

Some microprocessors require two different voltages to be supplied. To deal with this requirement, a personal computer in accordance with an embodiment of the present invention has a constant voltage power source and a variable power source. FIG. 4 schematically shows a state in which two power sources 140 and 142 are coupled to the CPU module. The first power source 140 is a constant voltage source that supplies a constant voltage at 3.3 V to peripheral circuits within the CPU. The second power source 142 is a variable voltage source that supplies voltage having different levels in accordance with the installed microprocessor.

Figure 5:
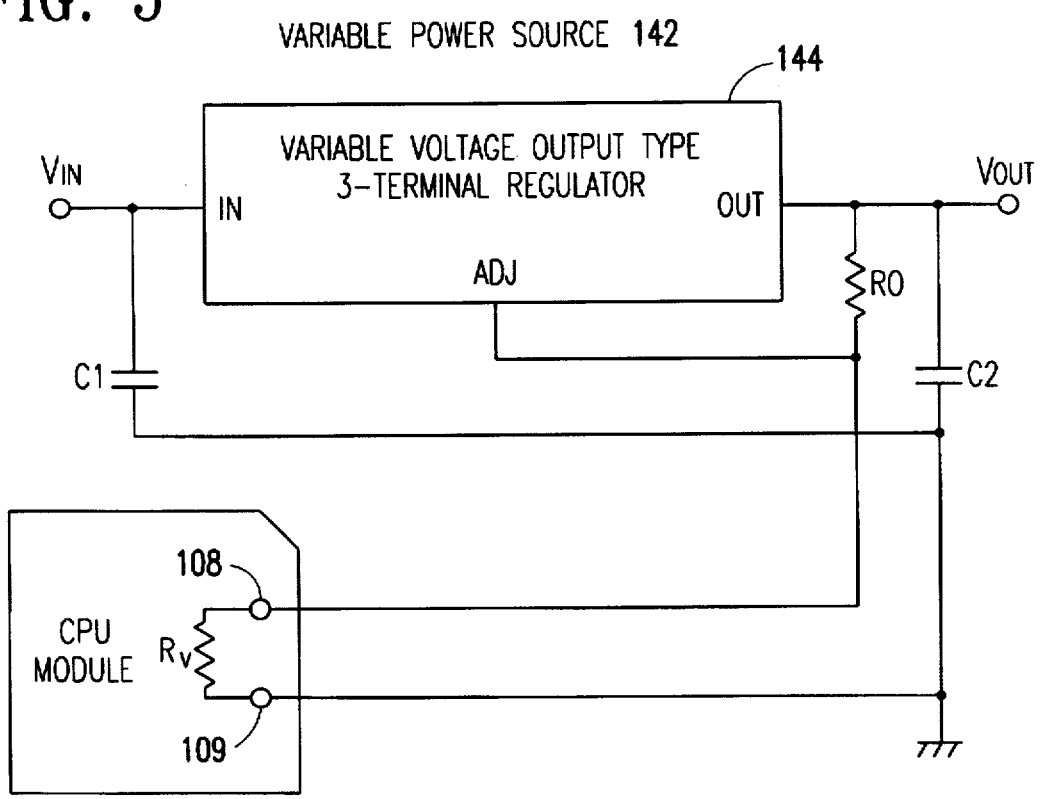
FIG. 5 shows a circuit diagram of the structure of a variable power source 142 in one embodiment.

FIG. 5 shows a circuit structure of the variable power source 142. The variable power source 142 has a voltage output variable type 3-terminal regulator 144 with its input terminal $V_{in}$ and output terminal $V_{out}$ being grounded through capacitors C1 and C2, respectively. The output terminal $V_{out}$ is connected to a feedback terminal ADJ through a first feedback resistor R0. A second feedback resistor Rv is provided between the terminals 108 and 109 of the CPU module. It is noted that the terminals 108 and 109 are connected to one of the two connectors 112 and 114 provided on the system board 110.

When a CPU module is installed, the terminal 109 is grounded, and the terminal 108 is connected to the feedback terminal ADF of the variable power source 142 and the first feedback resistor R1. As a result, a voltage produced by the division between the first feedback resistor R0 of the variable power source 142 and the second feedback resistor $R_v$ in the CPU module is fed back to the feedback terminal ADJ. Accordingly, by changing the resistor value of the second feedback resistor $R_v$ in accordance with the type of the microprocessor mounted in the CPU module, an appropriate output voltage $V_{out}$ is supplied to the microprocessor.

Figure 6:
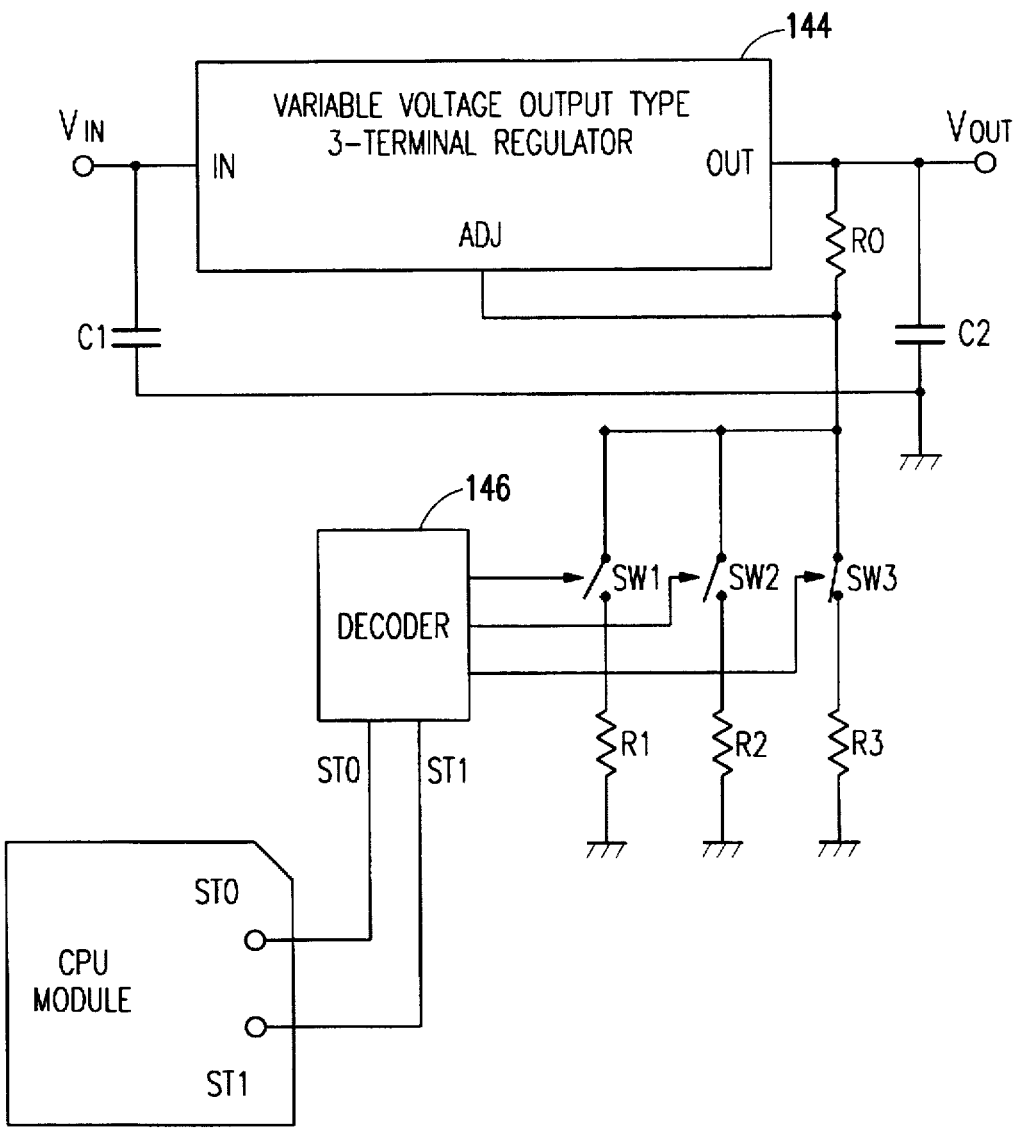
FIG. 6 shows a circuit diagram of the structure of a variable power source 142 in another embodiment.

FIG. 6 shows another circuit structure of the variable power source 142. A variable power source 142a has a three-terminal regulator 144 with its feedback terminal ADJ being connected in parallel to three switches SW1–SW3. Preferably, the switches SW1–SW3 are switching elements, such as FETs or the like. One of the switches SW1–SW3 is turned ON and the other two switches are turned OFF in response to a switch signal provided from a decoder 146. The decoder 146 decodes status signals provided from two status terminals ST0 and ST1 of the CPU module, and outputs a switch signal for switching the switches SW1–SW3. Feedback resistors R1–R3 that are connected respectively to the three switches SW1–SW3 have different resistor values. Therefore, the variable power source 142a outputs different voltages depending upon the levels of the status signals ST0 and ST1. Table 1 shows the relation between the status signals ST0, ST1 and the output voltage $V_{out}$. When the status signals ST0 and ST1 are both at "0" level, the resistor R1 is selected so that the voltage 3.3 V is outputted. When ST0=0 and ST1=1, the output voltage is 2.5 V. When ST0=1 and ST1=1, the output voltage is 2.0 V. For example, the voltage of 3.3 V is supplied to the first CPU module 100. The voltage of 2.5 V and the voltage of 2.0 V are supplied respectively to two types of the second CPU modules having different clock frequencies.

TABLE 1

| Voltage Value $V_{out}$ | ST0 | ST1 | Selected Resistor |
|---|---|---|---|
| 3.3 V | 0 | 0 | R1 |
| 2.5 V | 0 | 1 | R2 |
| 2.0 V | 1 | 0 | R3 |

By using the two status terminals ST0 and ST1, a maximum of four different output voltages $V_{out}$ can be supplied to the CPU module. In case more distinct voltages must be supplied to the CPU module, more status terminals may be provided. A variable resistor module with a built-in E2PROM that is capable of storing set values during a power-off period can be used as the resistor R1–R3 and the switch SW1–SW3.

C. Method of Increasing Secondary Cache

Figure 7A:
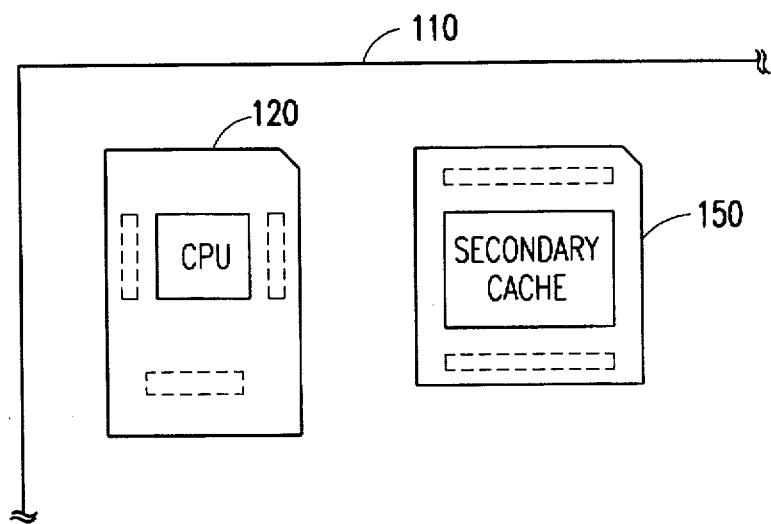
FIGS. 7(A), 7(B) and 7(C) schematically show a method of expanding a secondary cache.
Figure 7B:
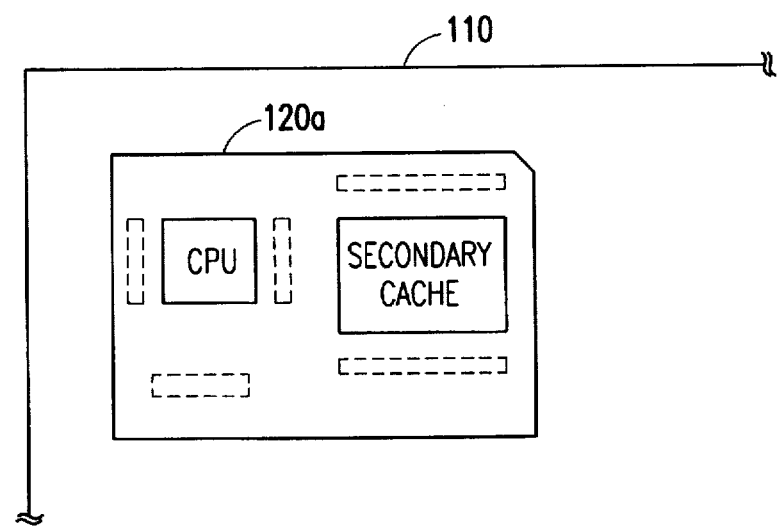

FIG. 7 schematically shows a method of increasing an external cache circuit that is called a secondary cache. FIG. 7(A) shows a case in which an independent cache module 150 is installed in addition to the second CPU module 120 shown in FIG. 2. FIG. 7(B) shows a case in which a secondary cache is provided in the second CPU module 120a. It is noted that the structure shown in FIG. 7(B) may be modified in a manner that the secondary cache is fixed to the CPU module, and the CPU can be attached to and detached from the CPU module. However, by the use of the independent cache module 150 is used as shown in FIG. 7(A), the secondary cache can be increased depending upon the requirements of a user. Also, when the CPU is further upgraded, there is an advantage that the secondary cache is not required to be changed. With respect to the first CPU module 100, the cache can be expanded in the manner shown in FIGS. 7(A) and (B).

Figure 7C:
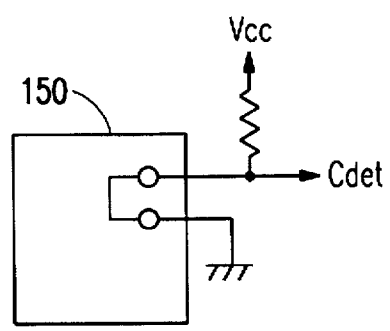

A determination is made as to whether or not the secondary cache is expanded, based on the level at the cache determination terminal that is provided at the connector of the cache module 150. FIG. 7(C) shows a state in which a cache determination signal Cdet is generated according to the connection state of the connector of the cache module 150. When the cache module 150 is installed, the cache determination terminal Cdet is grounded, and the cache determination signal Cdet assumes level "0". When the cache module 150 is not installed, the cache determination terminal Cdet is opened. As a result, the cache determination signal Cdet assumes level "1". Accordingly, by checking the cache determination signal, a determination can be made as to whether or not the secondary cache is expanded. A memory controller, which is described later, selects if the control of the secondary cache is made effective or made void based on the level at the cache determination terminal Cdet. Also, the memory can be optimally controlled by the use or non-use of the secondary cache.

C. Structure of Computer

Figure 8:
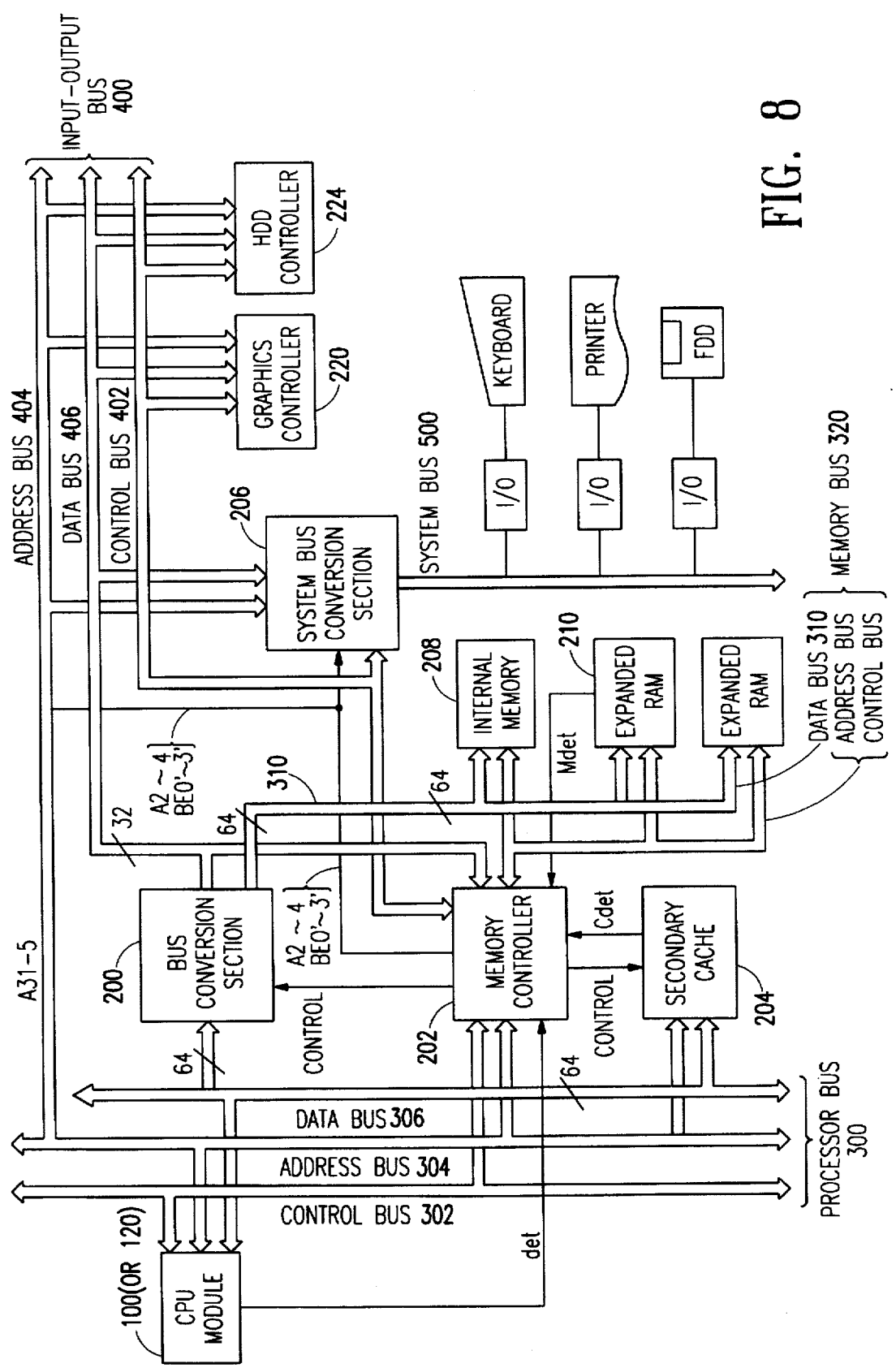
FIG. 8 shows a block diagram of the structure of a computer in accordance with an embodiment of the present invention.

FIG. 8 shows a block diagram of a structure of a personal computer in accordance with an embodiment of the present invention. The personal computer has a CPU module 100 (or 120), a bus conversion section 200, a memory controller 202, a secondary cache 204, a system bus conversion section 206, an internal memory (including ROM and RAM) 208, and an expanded RAM 210. It is noted that a user can select whether or not the secondary cache 204 and the expanded RAM 210 are used.

A module determination signal det outputted from the CPU module 100 (or 120) and a cache determination signal Cdet outputted from the cache module are provided to the memory controller 202. A memory determination signal Mdet outputted from a terminal of the expanded RAM 210 is also provided to the memory controller 202. The terminal for generating the memory determination signal has the same structure as the structure of the module determination terminal det shown in FIG. 3(C), or the structure of the cache determination terminal Cdet shown in FIG. 7(C). As described later, the memory controller 202 executes appropriate controls over the specific computer structure according to the determination signals det, Cdet and Mdet.

Either a 32-bit CPU 104 or a 64-bit CPU 124 can be selected and installed. A processor bus 300 that is connected to the CPU is comprised of a control bus 302, an address bus 304, and a 64-bit data bus 306.

The upstream side of the bus conversion section 200 is connected to the 64-bit data bus 306, and the downstream side is connected to a 64-bit memory data bus 310 and a 32-bit input-output data bus 406. The memory data bus 310 is connected to the internal memory 208 and the expanded RAM 210. The bus conversion section 200 is a circuit that performs bus conversion between the processor data bus 306 and the input-output data bus 406, and between the processor data bus 306 and the memory data bus 310. The internal structure and the operation of the bus conversion section 200 are described later.

The upstream side of the memory controller 202 is connected to the control bus 302 and the address bus 304 of the processor bus 300. The memory controller 202 provides a physical address and a control signal to the internal memory 208 and the expanded RAM 210, and performs input-output control over these memories. Also, the memory controller controls the secondary cache 204 when the secondary cache 204 is installed. The downstream side of the memory controller 202 is connected to an input-output control bus 402.

An input-output bus 400 is comprised of a 32-bit data bus 406, an address bus 404, and a control bus 402. The input-output bus 400 is a relatively high speed bus, and is connected to the system bus conversion section 206, and also connected to a graphics controller 220 and a hard disc controller 224. The graphics controller 220 is connected to a VRAM (Video RAM) (not shown), a display device and the like.

The system bus conversion section 206 is a circuit that performs bus conversion between the input-output bus 400 and a system bus 500. The system bus 500 is a relatively low-speed bus having a 16-bit data bus, and is connected to a keyboard, a printer, a floppy disk drive and the like are coupled through the I/O controller.

The system bus conversion section 206 includes a highest speed processor bus 300 having a 64-bit data bus width, a high speed memory bus 320 having a 64-bit data bus width, a relatively high speed input-output bus 400 having a 32-bit data bus width, and a relatively low speed system bus 500 having a 16-bit data bus width. Bus conversion between the processor bus 300 and the input-output bus 400, and between the processor bus 300 and the memory bus 320 is primarily performed by the bus conversion section 200. Bus conversion between the input-output bus 400 and the system bus 500 is primarily performed by the system bus conversion section 206.

D. Internal Structure and Operation of Memory Controller 202

Figure 9:
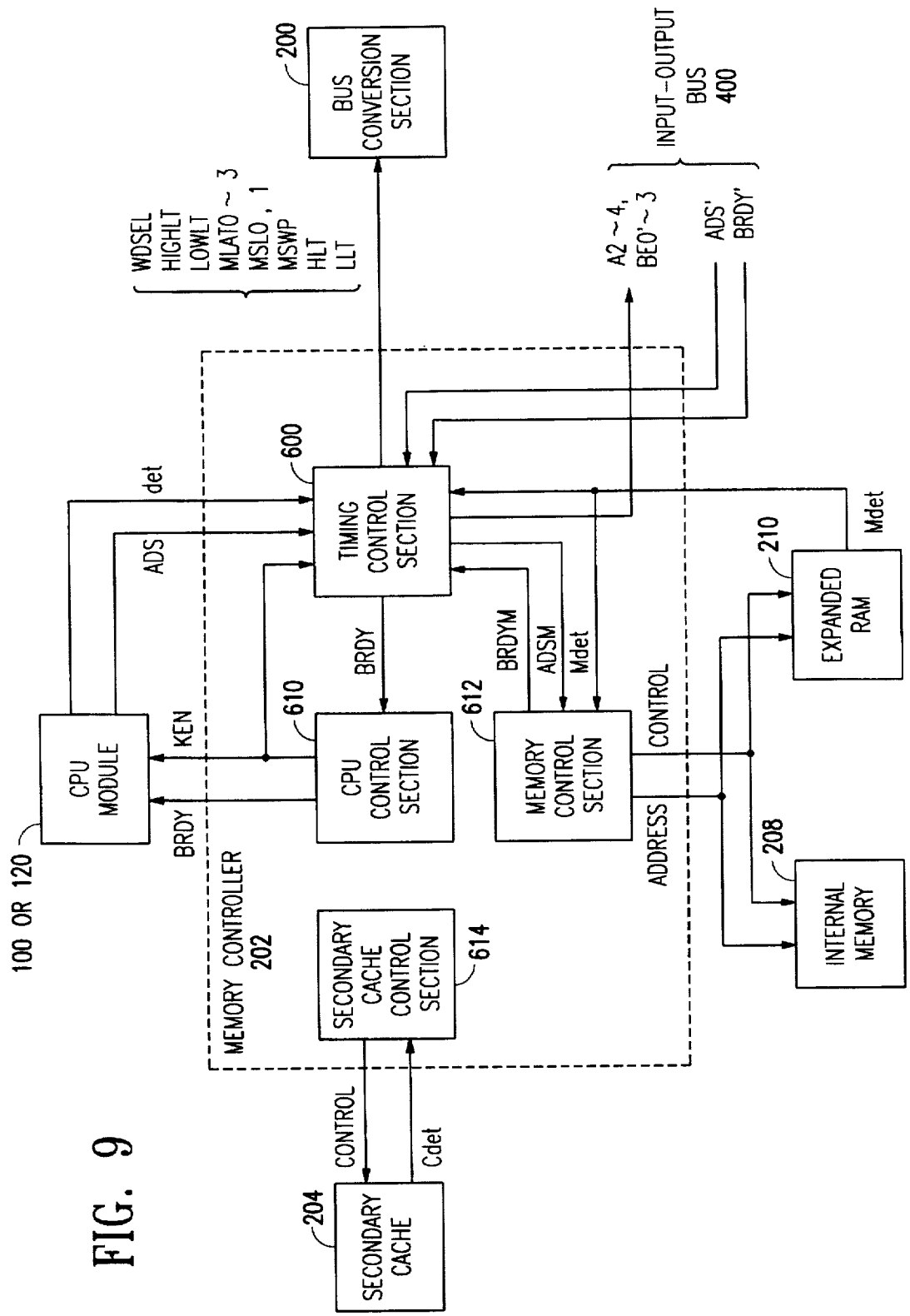
FIG. 9 shows a block diagram of the internal structure of a memory controller 202.

FIG. 9 shows a block diagram of an internal structure of the memory controller 202. The memory controller 202 has a timing control section 600, a CPU control section 610, a memory control section 612 and a secondary cache control section 614. FIG. 9 shows signals related to the embodiment. Other signals are omitted for convenience.

The timing control section 600 receives a module determination signal det from the CPU module, and also receives a memory determination signal Mdet from the terminal of the expanded RAM 210. The timing control section 600 provides a variety of signals to the memory control section 612 and the bus conversion section 200 in response to the determination signals det and Mdet. Functions of these signals will be described later. The memory control section 612 provides an address and a control signal to the internal memory 208 and the expanded RAM 210 for controlling the memories based upon the signals provided by the timing control section 600. The CPU control section 610 provides to the CPU a cache enable signal KEN that indicates whether or not the cache is effective, and a burst ready signal BRDY that indicates the completion of a bus cycle. The secondary cache control section 614 receives a cache determination signal Cdet from the cache module, and performs control over the secondary cache 204 if the secondary cache is expanded.

It is noted that an address outputted from the 32-bit CPU 104 includes an upper address of 30 bits A31–A2, and a lower address of 4 bits BE0–BE3 as a byte enable signal. Namely, an address consisting of 4 bytes is designated by the upper address A31–A2, and an effective byte among the 4 bytes is indicated by each of BE0–BE3 in the byte enable signal. An address outputted from the 64-bit CPU includes an upper address of 29 bits A31–A3, and a lower address of 8 bits BE0–BE7 as a byte enable signal. Namely, an address of 8 bytes is designated by the upper address A31–A3, and an effective byte among the 8 bytes is indicated by each of BE0–BE7 in the byte enable signal. For example, when the byte enable signal is at "L" level at BE0, the least significant one byte among the 8 bytes is effective. When the byte enable signal is at "L" level at BE7, the most significant one byte among the 8 bytes is effective. When all the eight bytes are effective, the byte enable signal is at "L" level at all BE0–BE7.

As shown above, different CPUs having different data bus widths provide different addresses. The timing control section 600 therefore adjusts an address signal depending upon the data bus width of an installed CPU.

Figure 10:
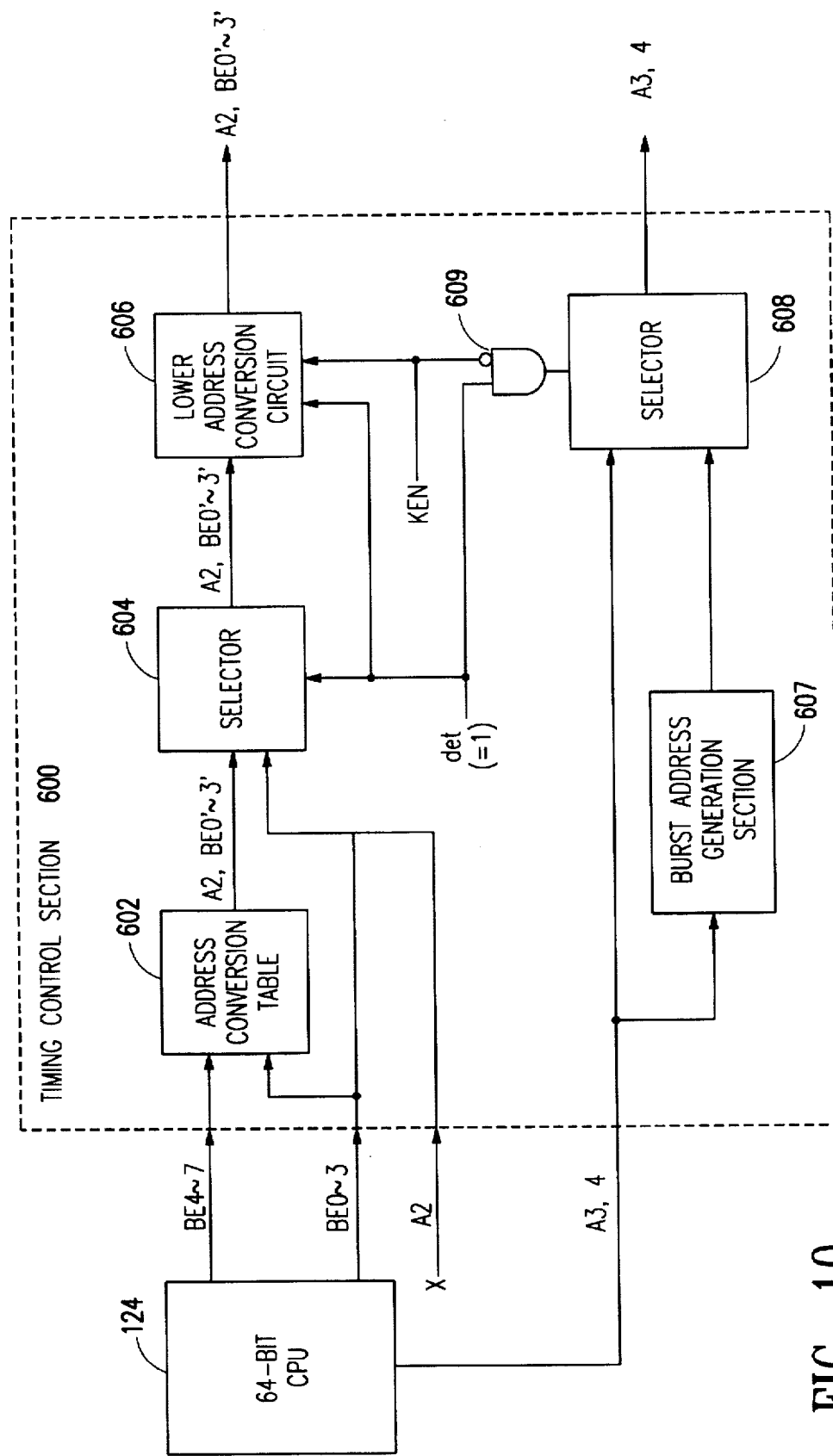
FIG. 10 shows a block diagram of the structure of an address adjusting circuit that is included in a timing control section 600 when a 64-bit CPU is installed.

FIG. 10 shows a block diagram of the structure of an address adjusting circuit that is included in the timing control section 600. The figure shows an example in which a 64-bit CPU 124 is installed. The address adjusting circuit has an address conversion table 602, a first selector 604, a lower address conversion circuit 606, a burst address generation section 607, a second selector 608, and an AND gate 609. When the 64-bit CPU is installed, the CPU 124 provides an 8-bit enable signal consisting of BE0–BE7, but does not provide an address A2. The address table 602 is used to convert an 8-bit byte enable signal consisting of BE0–BE7 into an address A2 and a byte enable signal consisting of BE0'–BE3' for a 32-bit data bus.

It is noted that the address A2 and the 4-bit byte enable signal consisting of BE0–BE3 indicate which bytes in the continuous 64 bits (8bytes) are effective, and therefore has substantially the same function as that of the 8-bit byte enable signal consisting of BE0–BE7. In other words, both a combination signal of the address A2 and the 4-bit byte enable signal consisting of BE0–BE3, and the 8-bit byte enable signal consisting of BE0–BE7 are signals that indicate which bytes in the data bus width (64 bits) of the second CPU module 120 are effective and correspond to a "lower address" in accordance with the embodiment.

Figure 11:
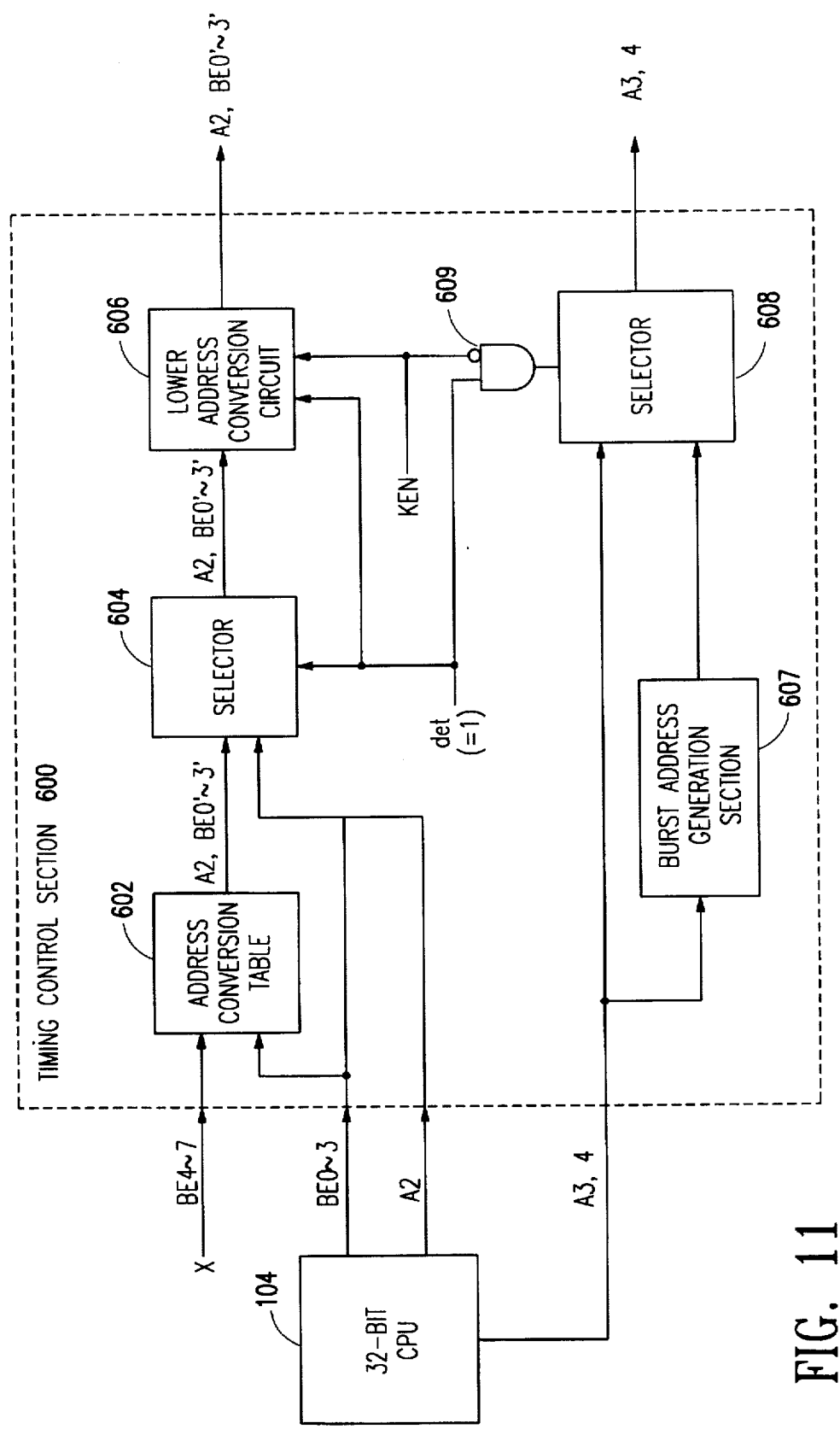
FIG. 11 shows a block diagram of the structure of an address adjusting circuit that is included in a timing control section 600 when a 32-bit CPU is installed.

When a 32-bit CPU 104 is installed, as shown in FIG. 11, the CPU 104 provides a 4-bit byte enable signal consisting of BE0–BE3 and an address A2, but does not provide an upper byte enable signal BE4–BE7. The byte enable signal BE0–BE3 and the address A2 outputted from the 32-bit CPU 104 are inputted in the selector, and then outputted as the lower address A2 and BE0'–BE3' as it is.

Tables 2 and 3 below show the relation between inputs and outputs provided by the address conversion table 602. In Tables 2 and 3, "H" indicates "H" level, "L" indicates "L" level, and "X" indicates a specified level. The level of the address A2 is determined by AND condition of each input signal shown in Table 2. The byte enable signal BE0'–BE3' is determined by OR condition of each input signal shown in Table 3.

TABLE 2

| Input-Output of Byte Enable Generation Circuit 602 | | | | | | | | |
|---|---|---|---|---|---|---|---|---|
| INPUT (AND CONDITION) | | | | | | | | OUTPUT |
| BE7 | BE6 | BE5 | BE4 | BE3 | BE2 | BE1 | B30 | A2 |
| X | X | X | X | X | X | X | L | 0 |
| X | X | X | X | X | X | L | H | 0 |
| X | X | X | X | X | L | H | H | 0 |
| X | X | X | X | L | H | H | H | 0 |
| X | X | X | L | H | H | H | H | 1 |
| X | X | L | H | H | H | H | H | 1 |
| X | L | H | H | H | H | H | H | 1 |
| L | H | H | H | H | H | H | H | 1 |

TABLE 3

| INPUT (OR CONDITION) | | | | | | | | OUTPUT | | | |
|---|---|---|---|---|---|---|---|---|---|---|---|
| BE7 | BE6 | BE5 | BE4 | BE3 | BE2 | BE1 | BE0 | BE3' | BE2' | BE1' | BE0' |
| L | X | X | X | L | X | X | X | L | X | X | X |
| X | L | X | X | X | L | X | X | X | L | X | X |
| X | X | L | X | X | X | L | X | X | X | L | X |
| X | X | X | L | X | X | X | L | X | X | X | L |

The selector 604 selects one of the lower address A2, BE0'–BE3' generated by the address conversion table 602 and the lower address A2, BE0–BE3 outputted from the CPU, based upon the module determination signal det. When the 64-bit CPU 124 is installed, the lower address A2, BE0'–BE3' is selected. On the other hand, when the 32-bit CUP 104 is installed, the lower address A2, BE0–BE3 outputted from the CPU 104 is selected. The address A2 selected by the selector 604 is outputted, and the byte enable signal BE0'–BE3' is provided to the lower address conversion circuit 606.

The lower address conversion circuit 606 is a circuit that converts the address A2 and the byte enable signal BE0'–BE3' according to the cache enable signal KEN. The cache enable signal KEN is a signal that is generated by the CPU control section 610 (FIG. 9) and indicates whether caching is effective or void. Caching is effective only in a specific part of the address space of a memory. An effective caching address range is registered in the memory controller 202. When the CPU reads data from a memory, an address is transferred to the memory controller 202. The CPU control section 610 determines whether or not the address is within the effective caching address range, and provides a cache enable signal KEN.

A cache of the 32-bit CPU 104 has cache lines, each composed of 16 bytes. Data in the memory is read out and fetched to the cache for each cache line. Therefore, to read data for one cache line from the memory and fetch it to the cache of the 32-bit CPU 104, data transfer is required four times with all the 32 bits (4 bytes) being effective. A cache of the 64-bit CPU 124 has cache lines, each composed of 32 bytes. Therefore, to read data for one cache line from the memory and fetch it to the cache of the CPU 124, data transfer is required four times with all the 64 bits (8bytes) being effective. Namely, in both of the CPUs, within an effective caching address range, data for one cache line is read into the cache by successively reading data four times with the entire data bus width being effected.

The operation of successively reading or writing data plural times is called the burst cycle or the burst transfer. When the 32-bit CPU 104 is installed, the lower address conversion circuit 606 converts all the four bits BE0'-BE3' of a byte enable signal to "L" level in case of an effective caching burst reading cycle. When the 64-bit CPU 124 is installed, the lower address conversion circuit 606 converts all the four bits BE0'-BE3' of a byte enable signal to "L" level, and changes the value of the address A2 to "0" and to "1", successively A burst address generation section 607 (FIGS. 10 and 11) is a circuit that generates an address A3, A4 required for the burst cycle. During the burst cycle of the 64-bit CPU, the address A3, A4 is required to be successively incremented while the transfer of eight bytes is performed four times. However, the 64-bit CPU does not increment the address A3, A4. Therefore, the burst address generation section 607 successively increments the address A3, A4 in synchronism with the transfer repeated four times. The cache enable signal KEN and the module determination signal det are inputted in the AND gate 609. An output from the AND gate 609 is provided to a selection signal terminal of the second selector 608. When the 64-bit CPU 124 is installed, the burst cycle is performed when caching is effective. In this respect, the address A3, A4 generated by the burst address generating section 607 are selected in response to the cache enable signal KEN, and outputted to the input-output bus 400. It is noted that when the 32-bit CPU 104 is installed, the CPU 104 increments addresses A2 and A3 during the burst cycle. Accordingly, the addresses A2 and A3 are outputted from the first selector 604 and the second selector 608 as it is, respectively.

FIG. 12 shows a timing chart of a bus cycle when data is read from a memory that is connected to the input-output bus 400 into the 64-bit CPU 124. For a reading cycle in which caching is void, as shown in FIGS. 12 (a)–(i), the CPU outputs an address status signal ADS and a new bus cycle is started. The timing control section 600 outputs to the input-output bus 400 an address status signal ADS' (FIG. 12 (e)) that indicates the start of a bus cycle. The memory controller 202 determines whether or not an address A31–A3 (in effect, an address A31–A5 for each 32 bytes) is within the effective caching address range. In case caching is void, the cache enable signal KEN is maintained at "H" level. In this case, the lower address conversion circuit 606 outputs the lower address A2, BE0'-BE3' that is provided from the first selector 604. The second selector 608 outputs the address A3, A4 (not shown) that is provided from the CPU 124. When data is transferred to the input-output data bus 406, the input-output data bus 406 generates a burst ready signal BRDY' to notify to the timing control section 600 that the data has been transferred. By this, the bus cycle is completed.

When caching is effective, as shown in FIGS. 12 (j)–(r), the cache enable signal KEN assumes "L" level. Accordingly, the lower address conversion circuit 606 converts all of BE0'-BE3' of the byte enable signal provided from the first selector 604 to "L" level, and outputs a modified byte enable signal BE0'-BE3'. Also, the address A2 is successively changed to "0" and to "1" so that data composed of 64 bits is transferred in two sections, each having 32 bits. The second selector 608 selects and outputs the addresses A3, A4 (not shown) generated by the burst address generation section 607 in synchronism with the burst transfer of 64 bits repeated four times. When the 64-bit CPU 124 is installed, data having 32 bits is transferred eight times during the burst cycle. The timing control section 600 determines that a bus cycle is completed when eight pulses of the burst ready signal BRDY' are provided by the input-output bus 400.

As described above, the address conversion table 602 and the selector 604 adjust the lower address A2, BE0'-BE3' according to the data bus width of the CPU based on the module determination signal det. As a result, a lower address proper to the data bus width of an installed CPU can be generated.

It is noted that the lower address A2–A4, BE0'-BE3' generated by the timing control section 600 together with the address A31–A5 of the processor address bus form the input-output address bus 404.

E. Internal Structure of Bus Conversion Section 200

Figure 13:
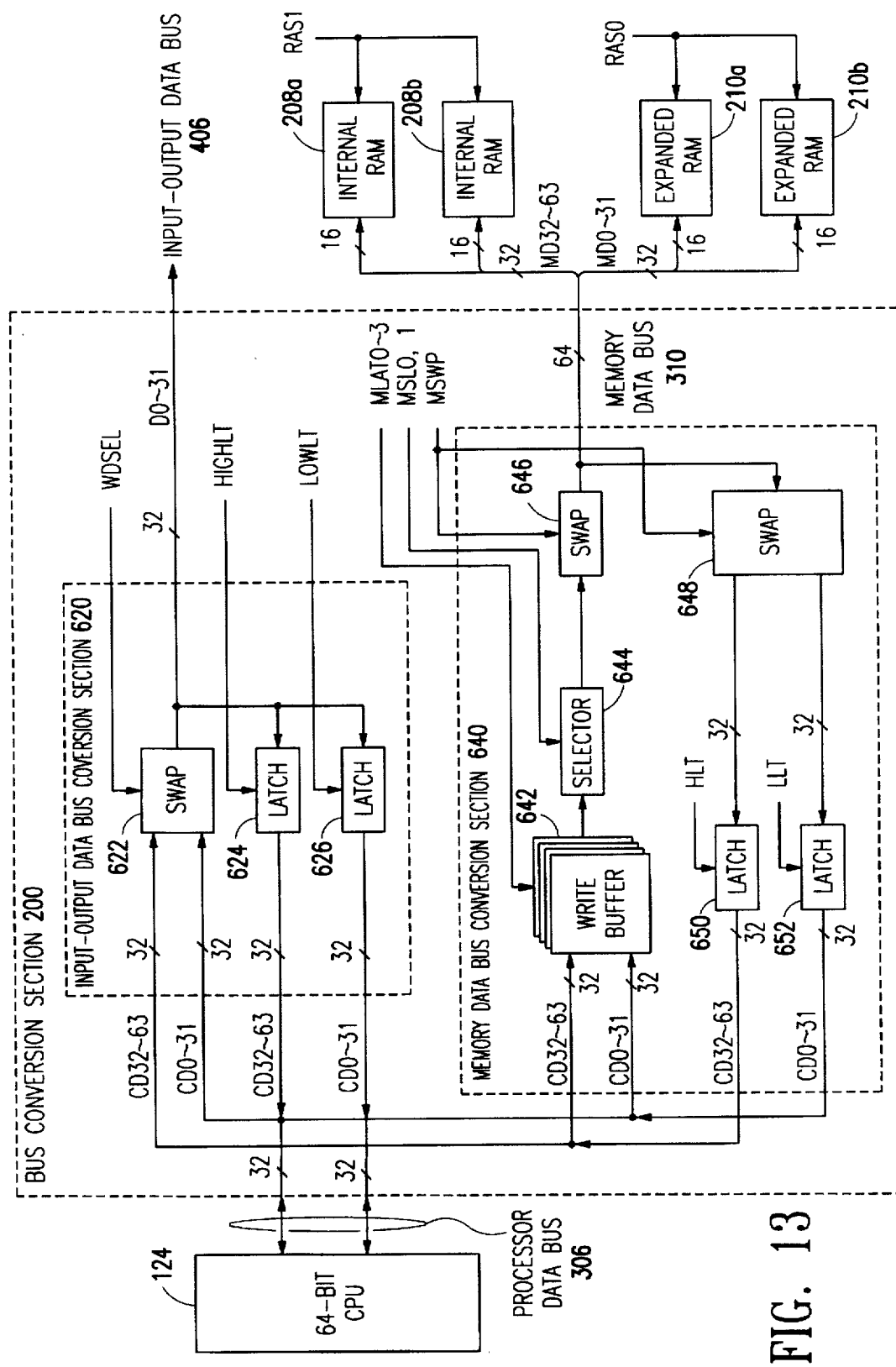
FIG. 13 shows a block diagram of the internal structure of a bus conversion section 200 when a 64-bit CPU is installed.
Figure 14:
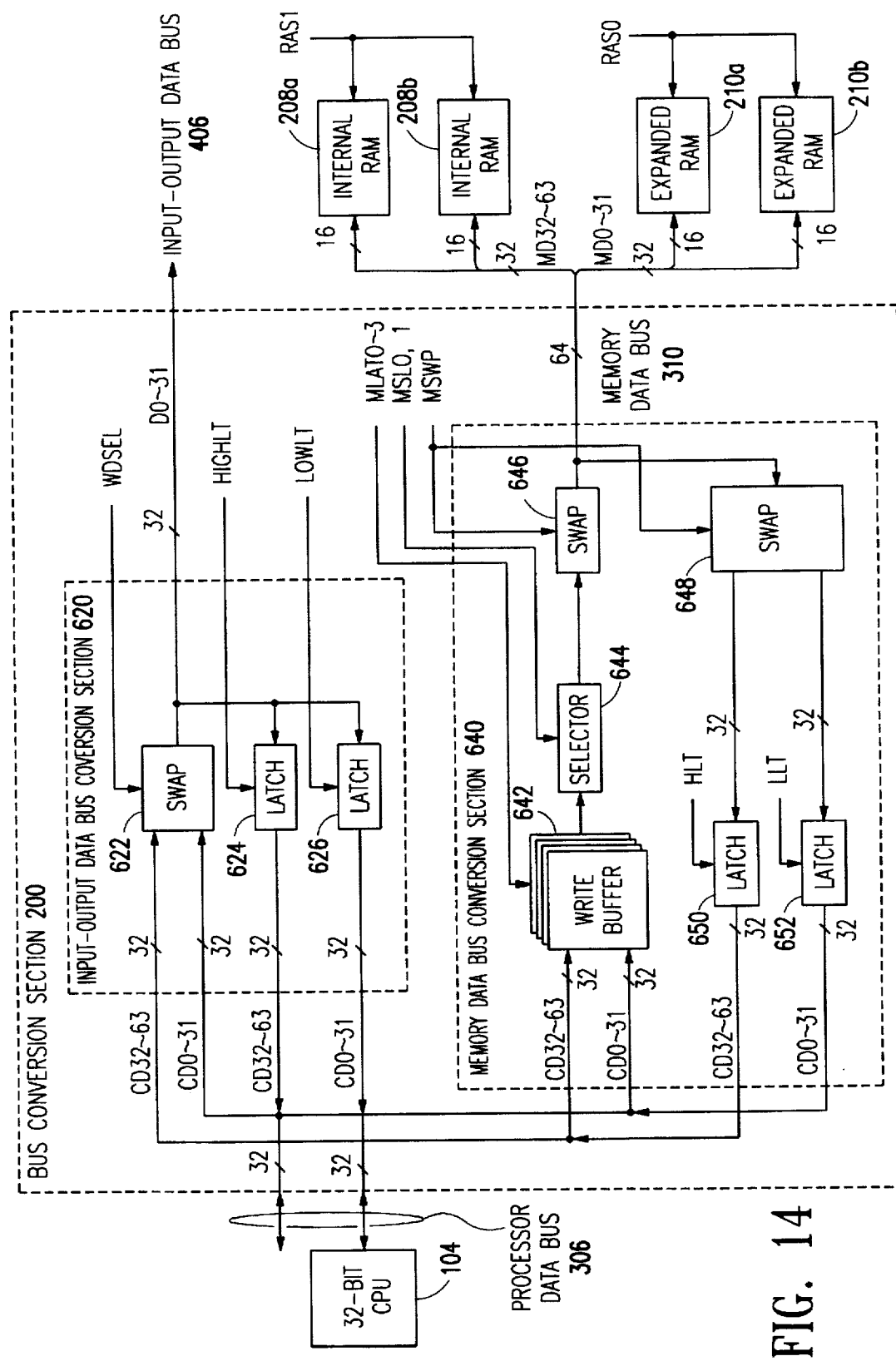
FIG. 14 shows a block diagram of the internal structure of a bus conversion section 200 when a 32-bit CPU is installed.

FIG. 13 shows a block diagram of an internal structure of the bus conversion section 200, in which a 64-bit CPU 124 is installed. FIG. 14 shows a case in which a 32-bit CPU 104 is installed. The bus conversion section 200 has an input-output data bus conversion section 620 that performs conversion between the processor data bus 306 and the input-output data bus 406, and a memory data bus conversion section 640 that performs conversion between the processor data bus 306 and the memory data bus 310.

The input-output data bus conversion section 620 includes a swap circuit 622, and two latch circuits 624 and 626. The memory data bus conversion section 630 includes a write buffer 642, a selector 644, two swap circuits 646 and 648, and two latch circuits 650 and 652. Hereunder, the operation of the input-output data bus conversion section 620 is first described, and then the operation of the memory data bus conversion section 640 will be described.

F. Operation of Input-Output Data Bus Conversion Section 620

The swap circuit 622 of the input-output data bus conversion section 620 selects, in response to a write data selection signal WDSEL provided by the memory controller 202, one of upper 32 bits CD32–CD63 and lower 32 bits CD0–CD31 among 64-bit data provided from the CPU, and outputs the selected bits to the input-output data bus 406.

The two latch circuits 624 and 626 of the input-output data bus conversion section 620 each maintain data of 32 bits D0–D31 on the input-output data bus 406 in response to an upper latch signal HIGHLT and a lower latch signal LOWLT provided by the memory controller 202, and output the data as 64-bit data to the processor data bus 306.

Figure 15:
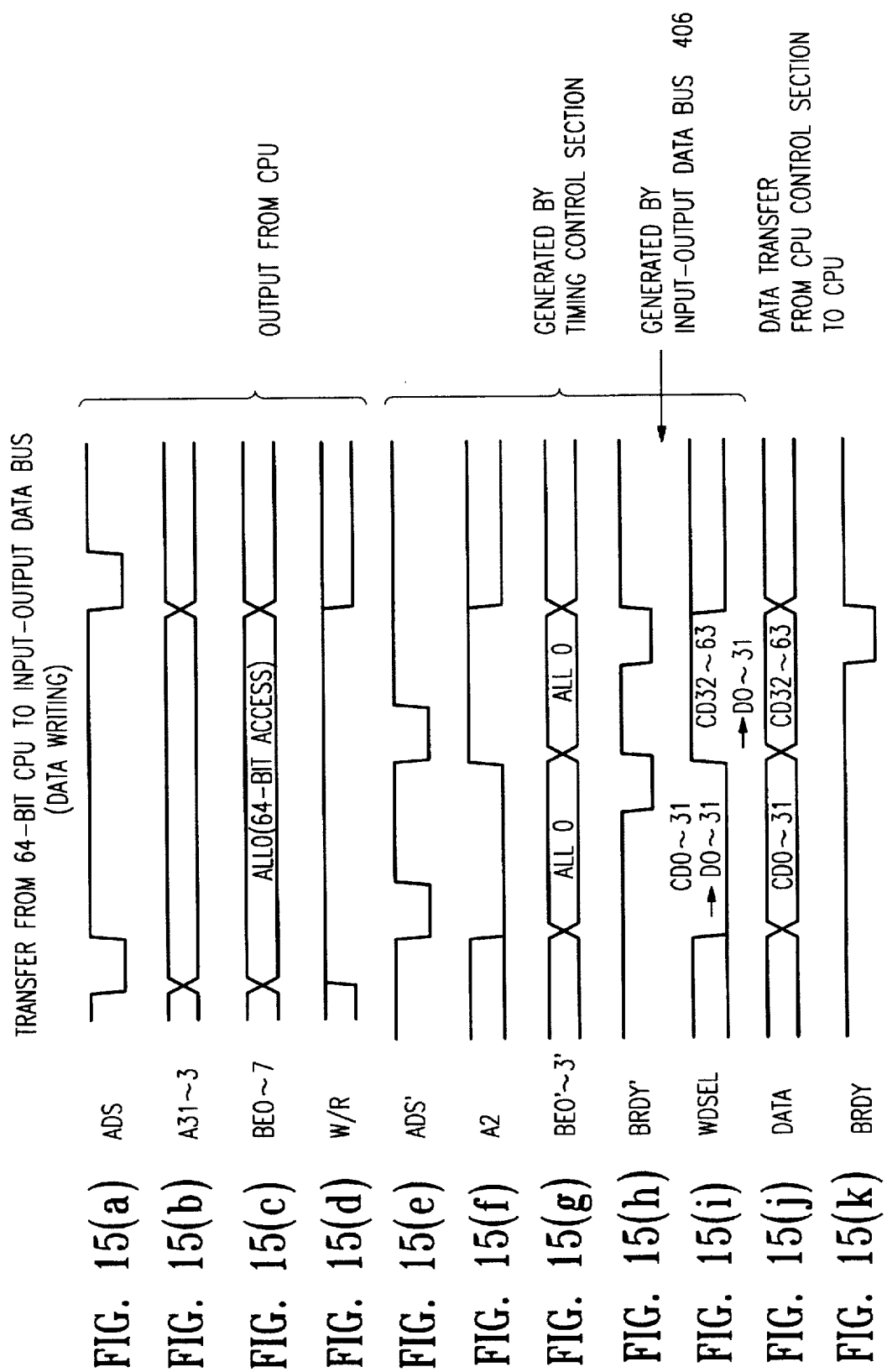
FIGS. 15(a)–(k) show a timing chart of a data transfer operation of transferring data from a 64-bit CPU 124 to an input-output data bus 406.

FIG. 15 shows a timing chart of the operation of transferring data from the 64-bit CPU to the input-output data bus 406. FIGS. 15 (a)–(d) show signals outputted from the CPU. FIGS. 15 (e)–(g) show signals generated by the memory controller 202. FIG. 15 (h) shows a signal generated by the input-output data bus 406. FIG. 15 (j) shows data that is transferred, and FIG. 15 (k) shows a signal outputted from the memory controller 202 to the CPU.

The CPU 124 first brings an address status signal ADS shown in FIG. 15 (a) down to "L" level, and at the same time, outputs an address A31–A3 (FIG. 15 (b)) and a byte enable signal BE0–BE7 (FIG. 15 (c)), and sets a write/read signal W/R (FIG. 15 (d)) to "H" level (write). It is noted that an embodiment is described hereunder for a case in which the byte enable signal is at "L" level at all BE0–BE7 as shown in FIG. 15 (c), and thus all the 64 bits are effective.

The timing control section 600 (FIG. 9) generates an address status signal ADS' (FIG. 15 (e)) in response to the above described signals, and outputs the same to the input-output data bus 406. The timing control section 600 generates and outputs an address A2 (FIG. 15 (f)) and a byte enable signal BE0'–BE3' (FIG. 15 (g)). An address A3, A4, which is provided from the CPU, is outputted from the timing control section 600. The timing control section 600 also brings down the write select signal WDSEL (FIG. 15 (i)) to "L" level, and instructs to select the lower 32 bits CD0–CD31. As a result, data of the lower 32 bits CD0–CD31 is outputted from the swap circuit 622 as the 32 bits D0–D31 on the input-output data bus 406 (FIG. 15 (j)).

When data is inputted to the input-output data bus 406, the input-output data bus 406 outputs a burst ready signal BRDY' (FIG. 15 (h)) to the timing control section 600 to notify that the data is outputted. The timing control section 600 again brings the address status signal ADS' down (FIG. 15 (e)), to start data transfer of the upper 32 bits. Namely, by setting the address A2 (FIG. 15 (f)) to "1", and raising the write select signal WDSEL to "H" level, the upper 32 bits CD32–CD63 are selected. As a result, data of the upper 32 bits CD32–CD63 is outputted from the swap circuit 622 to the input-output data bus 406 (FIG. 15 (j)).

When data of the lower 32 bits CD0–CD31 and data of the upper 32 bits CD32 CD63 are successively transferred to the input-output data bus 406, the memory controller 202 outputs a burst ready signal BRDY (FIG. 15 (k)) to the CPU 124, to notify that the data transfer is completed.

Figure 16:
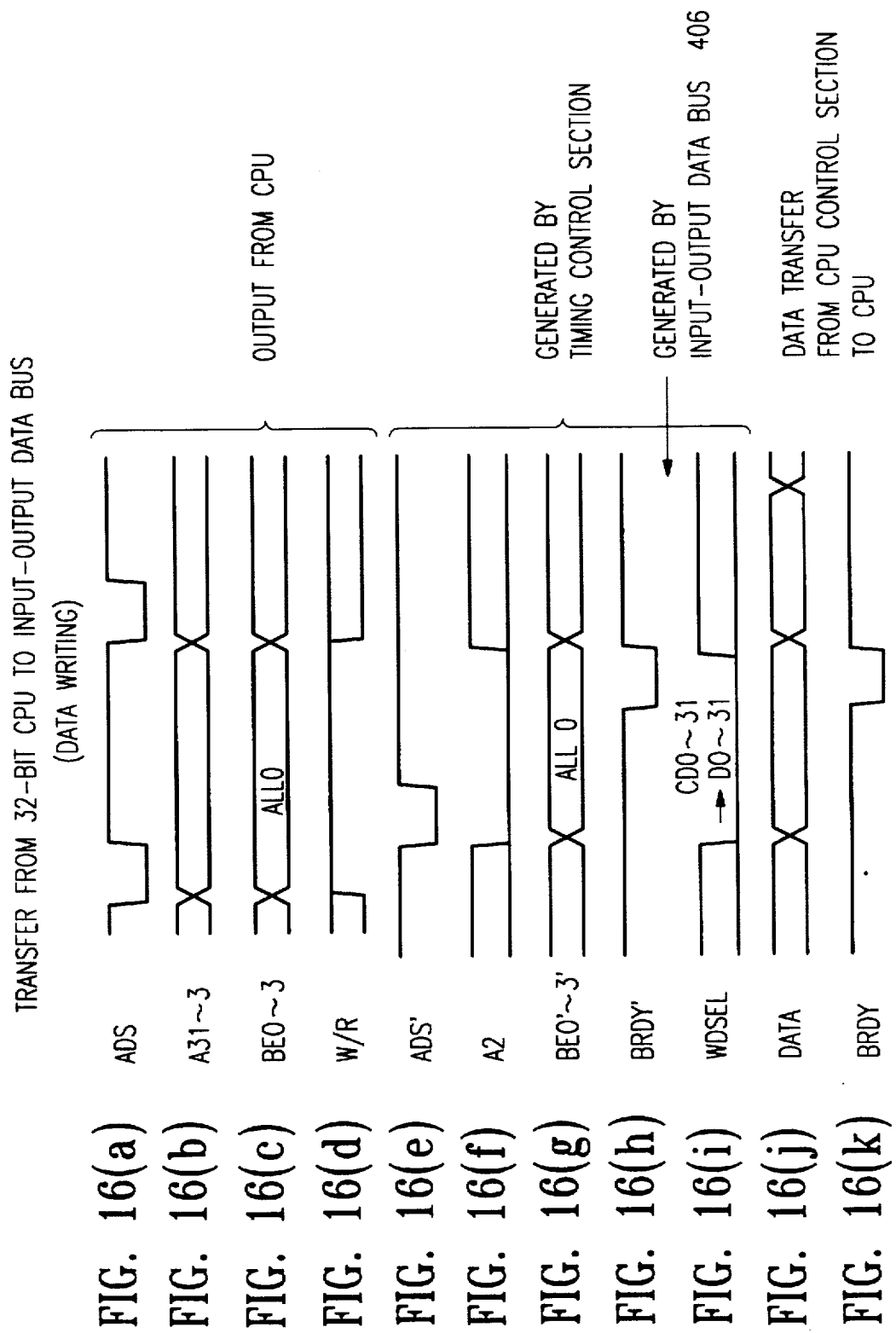
FIGS. 16(a)–(k) show a timing chart of a data transfer operation of transferring data from a 32-bit CPU 104 to an input-output data bus 406.

FIG. 16 shows a timing chart of the operation of data transfer from the CPU to the input-output data bus 406 when the 32-bit CPU 104 is installed. The operation shown in FIG. 16 is generally similar to the former half of the operation shown in FIG. 15. However, as shown in FIG. 16 (b), the 32-bit CPU 104 outputs an address status signal ADS (FIG. 16 (a)) as well as an address A31–A2 and a byte enable signal BE0–BE3. When data of the lower 32 bits CD0–CD31 is transferred to the input-output data bus 406, the memory controller 202 outputs a burst ready signal BRDY (FIG. 16 (k)) to the CPU 104, to notify that the data transfer is completed.

When the memory controller 202 is instructed to transfer data by the CPU, the memory controller 202 selects and executes one of the two types of data transfer operation shown in FIG. 15 and FIG. 16 in response to the module determination signal det which is provided from the CPU module. Therefore, if a CPU having a different data bus width is installed, data can be transferred between the CPU and the circuits on the input-output bus 400 without a problem.

A circuit capable of selecting more than one continuous bytes in response to the lower address (an 8-bit byte enable signal BE0'–BE7', or an address A2 and a 4-bit byte enable signal BE0'–BE3), such as the swap circuit 622, can be used.

Figure 17:
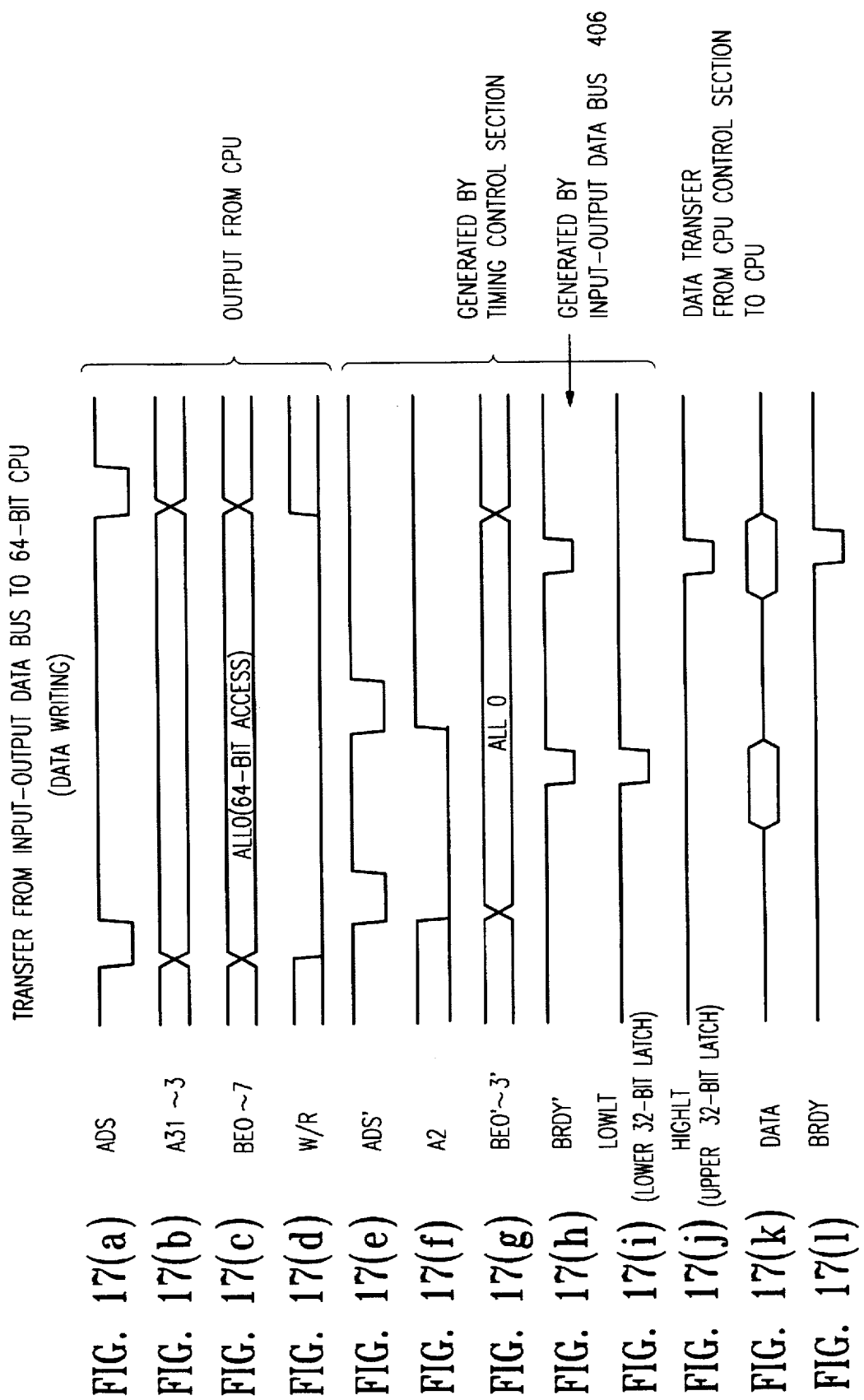
FIGS. 17(a)–(l) shows a timing chart of a data transfer operation of transferring data from an input-output data bus 406 to a 64-bit CPU 124.

FIG. 17 shows a timing chart of the operation of data transfer from the input-output data but 406 to the 64-bit CPU 124. FIGS. 17 (a)–(d) show signals outputted from the CPU. FIGS. 17 (e)–(g), (i) and (j) show signals generated by the memory controller 202. FIG. 17 (h) shows a signal generated by the input-output data bus 406. FIG. 17 (k) shows data to be transferred, and FIG. 17 (l) shows a signal that is outputted from the memory controller 202 to the CPU.

The CPU 124 first brings an address status signal ADS shown in FIG. 17 (a) down to "L" level, and at the same time, outputs an address A31–A3 (FIG. 17 (b)) and a byte enable signal BE0–BE7 (FIG. 17 (c)), and sets a write/read signal W/R (FIG. 17 (d)) to "L" level (write in).

The timing control section 600 (FIG. 9) generates an address status signal ADS' (FIG. 15 (e)) in response to the above described signals, and outputs the same to the input-output data bus 406. Also, the timing control section 600 generates and outputs an address A2 (FIG. 15 (f) and a byte enable signal BE0'–BE3' (FIG. 15 (g)). When data is outputted to the input-output data bus 406, the timing control section 600 brings down a lower latch signal LOWLT (FIG. 15 (i)) to "L" level, to maintain the data on the input-output data bus 406 in the lower side latch circuit 626. At this time, the input-output data bus 406 provides a burst ready signal BRDY' to the timing control section 600.

When the data of the lower 32 bits is latched, the timing control section 600 raises the address status signal ADS' (FIG. 17 (e)) again, sets the address A2 (FIG. 17 (f) to "1", and starts transferring the data of the upper 32 bits. When the 32-bit data is outputted to the input-output data bus 406, the timing control section 600 brings the upper latch signal HIGHLT down to "L" level to maintain the data on the input-output data bus 406 in the upper side latch circuit 624.

When the 32-bit data are maintained in the two latch circuits 624 and 636, respectively, in a manner described above, and 64-bit data is outputted to the processor data bus 306, the timing control section 600 outputs a burst ready signal BRDY (FIG. 17 (l)) to the CPU 124 through the CPU control section 610. The CPU 124 reads the 64-bit data.

Figure 18:
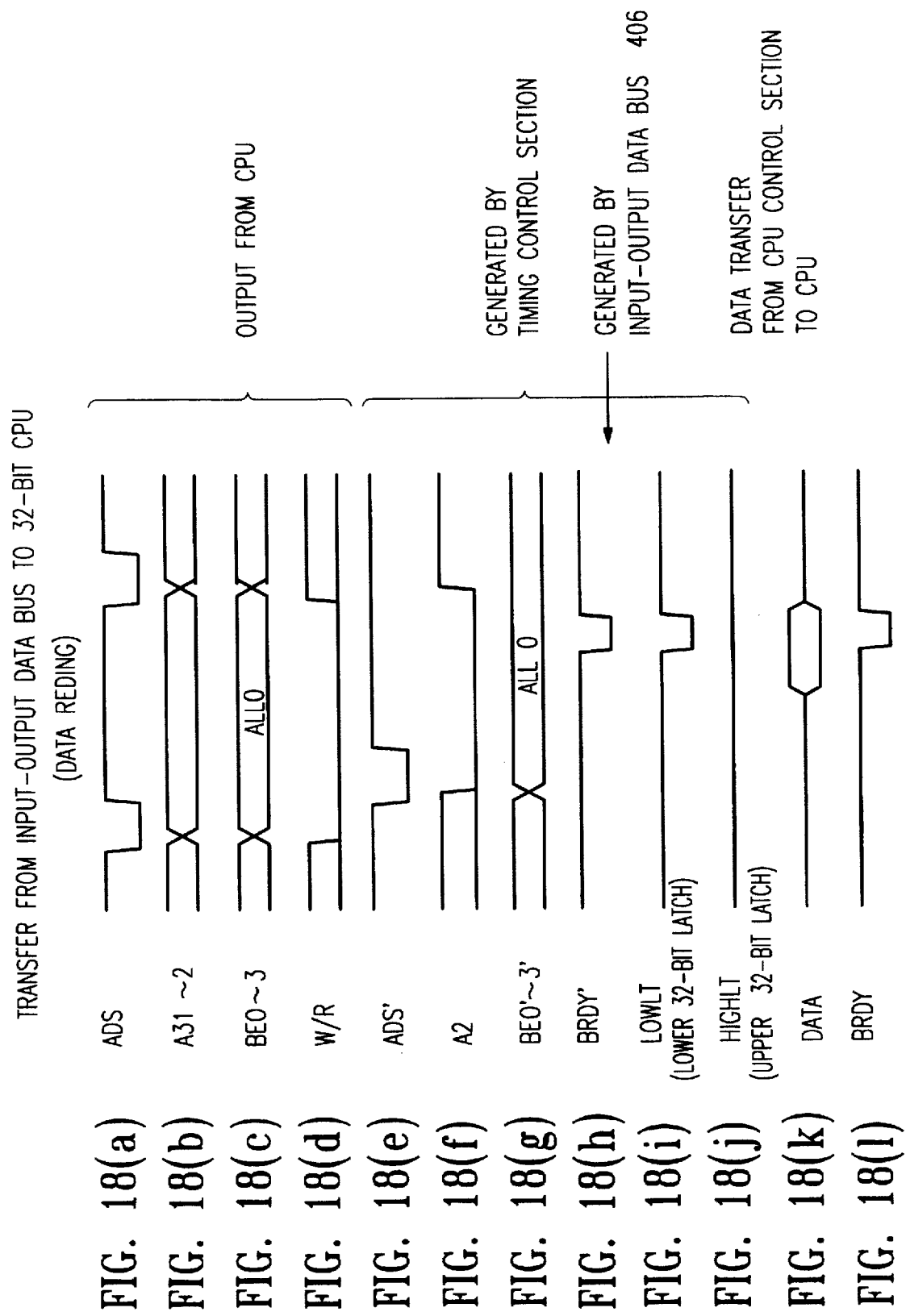
FIGS. 18(a)–(l) shows a timing chart of a data transfer operation of transferring data from an input-output data bus 406 to a 32-bit CPU 104.

FIG. 18 shows a timing chart of the operation of transferring data from the input-output data bus 406 to the CPU when the 32-bit CPU 104 is installed. FIG. 18 is generally similar to the former half of the timing chart shown in FIG. 17. Namely, when 32-bit data is latched in response to the lower latch signal LOWLT (FIG. 18 (i)), the memory controller 202 outputs a burst ready signal BRDY (FIG. 18 (l)) to the CPU 104, to notify that the preparation of data transfer is completed. The memory controller 202, when data transfer is instructed by the CPU, selects and executes one of the two data transfer operations shown in FIG. 17 and FIG. 18, according to the module determination signal det provided by the CPU module.

As described above, the input-output data bus conversion section 620 selectively executes a data transfer operation that is proper to the 64-bit CPU 124 or the 32-bit CPU 104 according to the module determination signal det. As a result, data transfer between the processor data bus 306 and the input-output data bus 400 is performed without a hitch whichever the first CPU module or the second CPU module is installed.

G. Operation of Memory Data Bus Conversion Section 640

Figure 19:
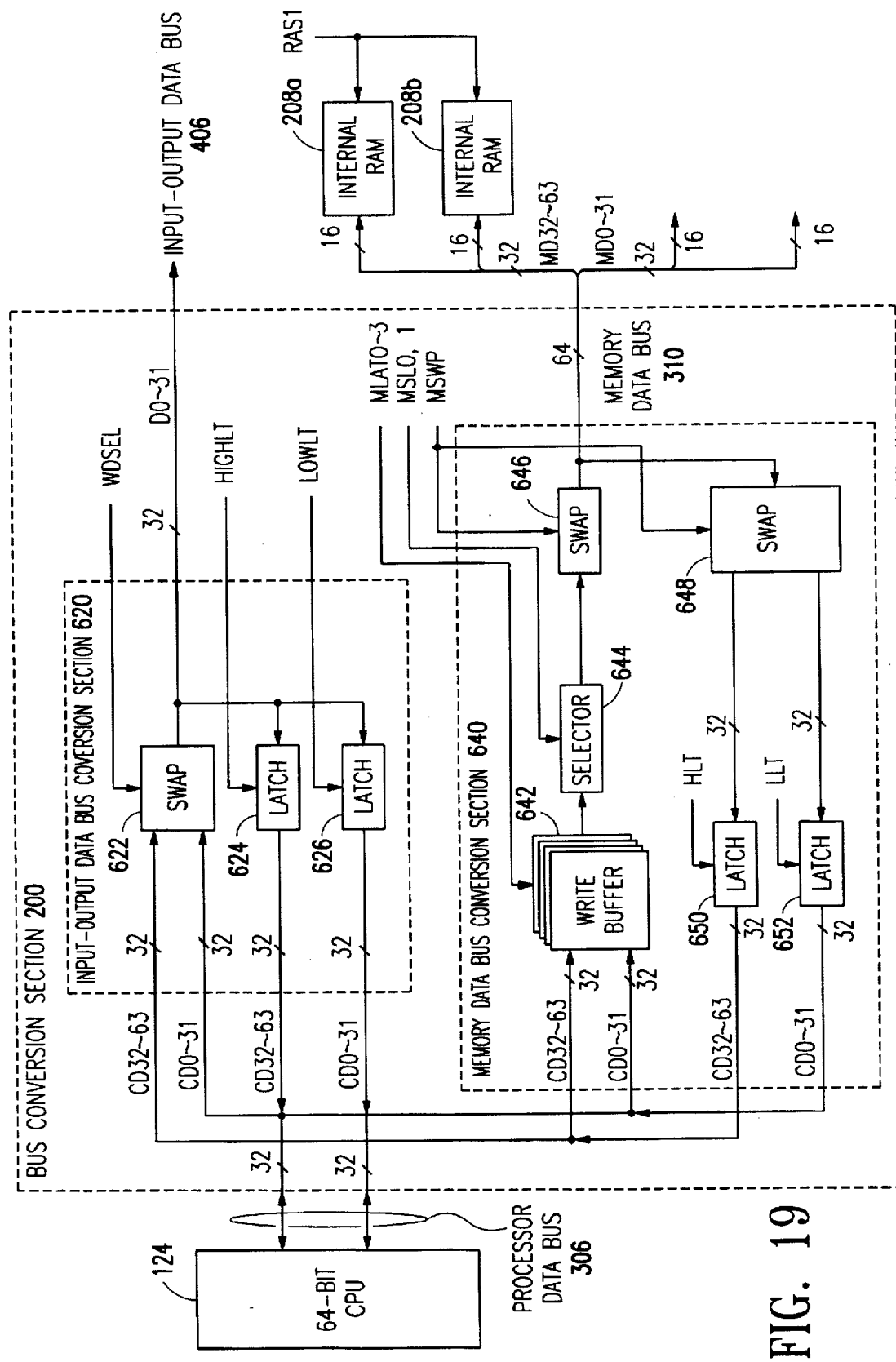
FIG. 19 shows a block diagram of the internal structure of a bus conversion section 200 where a 64-bit CPU 124 is installed and an expanded RAM 210 is not installed.
Figure 20:
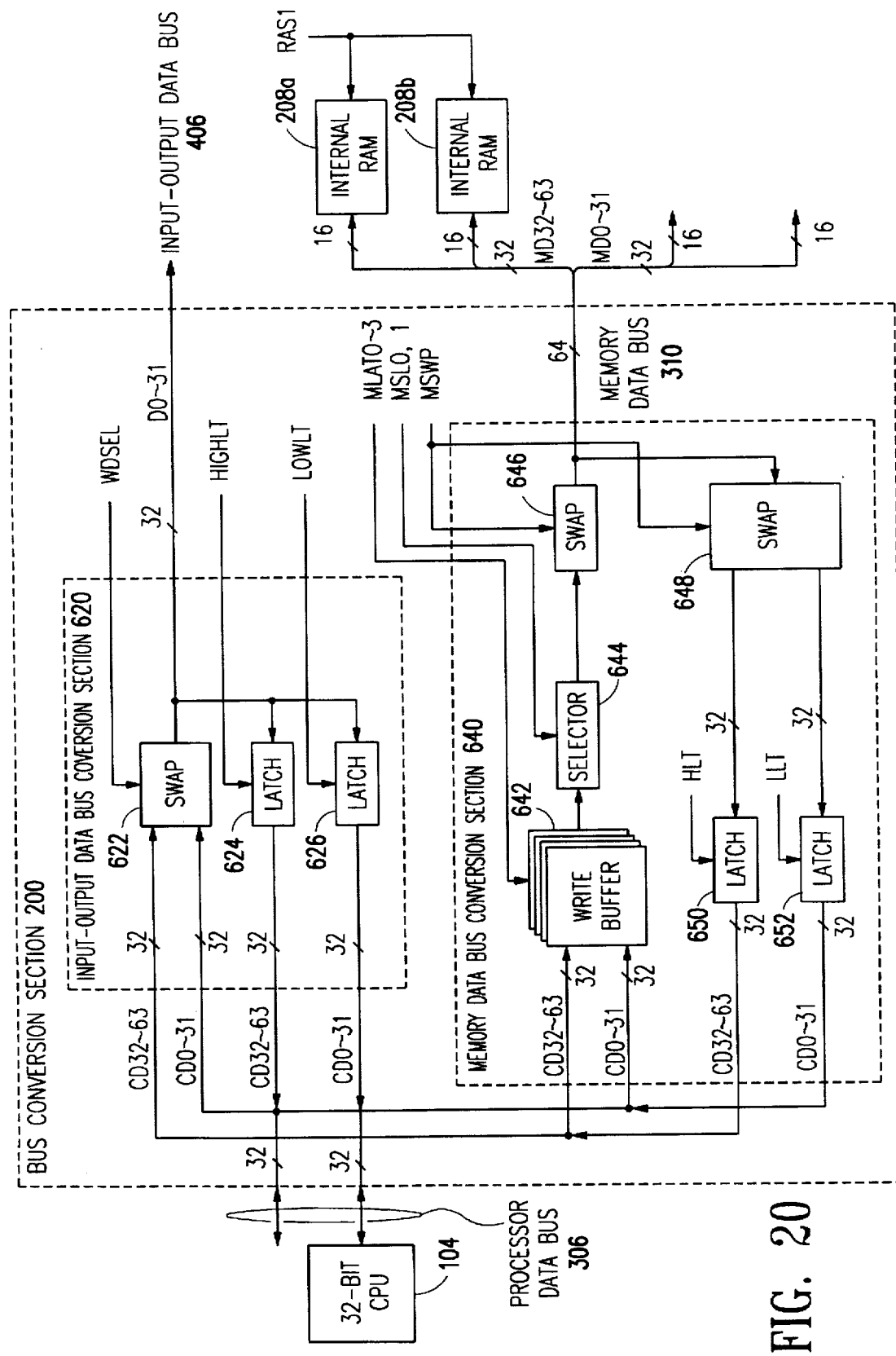
FIG. 20 shows a block diagram of the internal structure of a bus conversion section 200 where a 32-bit CPU 104 is installed and an expanded RAM 210 is not installed.

Before the operation of the memory data bus conversion section 640 is described in detail, the differences in the operation derived from the presence and the absence of the expanded RAM 210 is explained. In both embodiments described above with reference to FIG. 13 and FIG. 14, the expanded RAM 210a and 210b are provided. Each of the internal RAMs 208a and 208b and the expanded RAMs 210a and 210b is formed from a RAM having, for example, 2 Mbytes capacity in a 16 bits×1 Mbyte format. FIG. 19 shows a structure in which a 64-bit CPU 124 is installed, but the expanded RAM 210 is not installed. FIG. 20 shows a structure in which a 32-bit CPU 104 is installed, but the expanded RAM 210 is not installed. In these embodiments, there are four CPU-RAM combinations as shown in FIG. 13, FIG. 14, FIG. 19 and FIG. 20.

Writing operations between a CPU and a memory in these four cases are summarized in the following TABLE 4 below.

TABLE 4

| CPU RAM | 64-bit CPU | 32-bit CPU |
|---|---|---|
| Internal RAM + Expanded RAM (8 MB) | Case 1 (FIG. 13) 64 bits on the processor data bus are outputted as 64 bits on the memory data bus. | Case 2 (FIG. 14) Lower 32 bits on the processor data bus are outputted as either upper 32 bits or lower 32 bits on the memory data bus. |
| Internal RAM only (4 MB) | Case 3 (FIG. 19) 64 bits on the processor data bus are divided into upper data and lower data, and outputted as upper 32 bits on the memory data bus. | Case 4 (FIG. 20) Lower 32 bits on the processor data bus are outputted as upper 32 bits on the memory data bus. |

In Case 1 (64-bit CPU+Expanded RAM shown in FIG. 13), the processor data bus 306 and the memory data bus 310 are both driven with all the 64 bits being effective. Therefore, data on the processor data bus 306 is transferred to the memory data bus 310 as it is. At this moment, 64-bit data that is outputted from the CPU 124 is temporarily stored in a write buffer 642, and is passed through a selector 644 and a swap circuit 646 as it is.

The write buffer 642 and the selector 644 are circuits that are required during a burst write cycle. During the burst write cycle, data of 64 bits is written in a memory four times. The write buffer 642 includes four 64-bit buffers. During the burst write cycle, the write buffer 642 successively store four sets of 64-bit data in response to four latch signals MLAT0–MLAT3 provided by the timing control section 600 (FIG. 9). It is noted that the four cycles of addresses have a regularity. Accordingly, to renew an address at the bus conversion section 200, a clock signal may be inputted to the bus conversion section 200, clock pulses may be counted by a 2-bit counter, and the burst address may be renewed based on the counted value. In this case, a clock up signal for instructing the start of a burst cycle may be provided from the memory controller 202 to the bus conversion section 200.

The selector 644 selects one of the four buffers in response to 2-bit selection signals MSL0, MSL1 provided from the timing control section 600, and provides 64-bit data to the swap circuit 646. In an ordinary write cycle other than a burst write cycle, 64-bit data in one of the buffers in the write buffer 642 is used, and the data is merely passed through the selector 644. The swap circuit 646 passes data when all the 64 bits of the processor data bus 306 and the memory data bus 310 are effective.

In Case 2 in Table 4 (32-bit CPU+Expanded RAM shown in FIG. 14), the processor data bus 306 is driven with only the lower 32 bits CD0–CD31 being effective. In contrast, the memory data bus 310 is driven with all the 64 bits being effective. Accordingly, data of the lower 32 bits of the processor data bus 306 is passed through the write buffer 642 and the selector 644, and outputted as one of the upper 32 bits MD32–MD63 and the lower 32 bits MD0–MD31 of the memory data bus 310.

Figure 21:
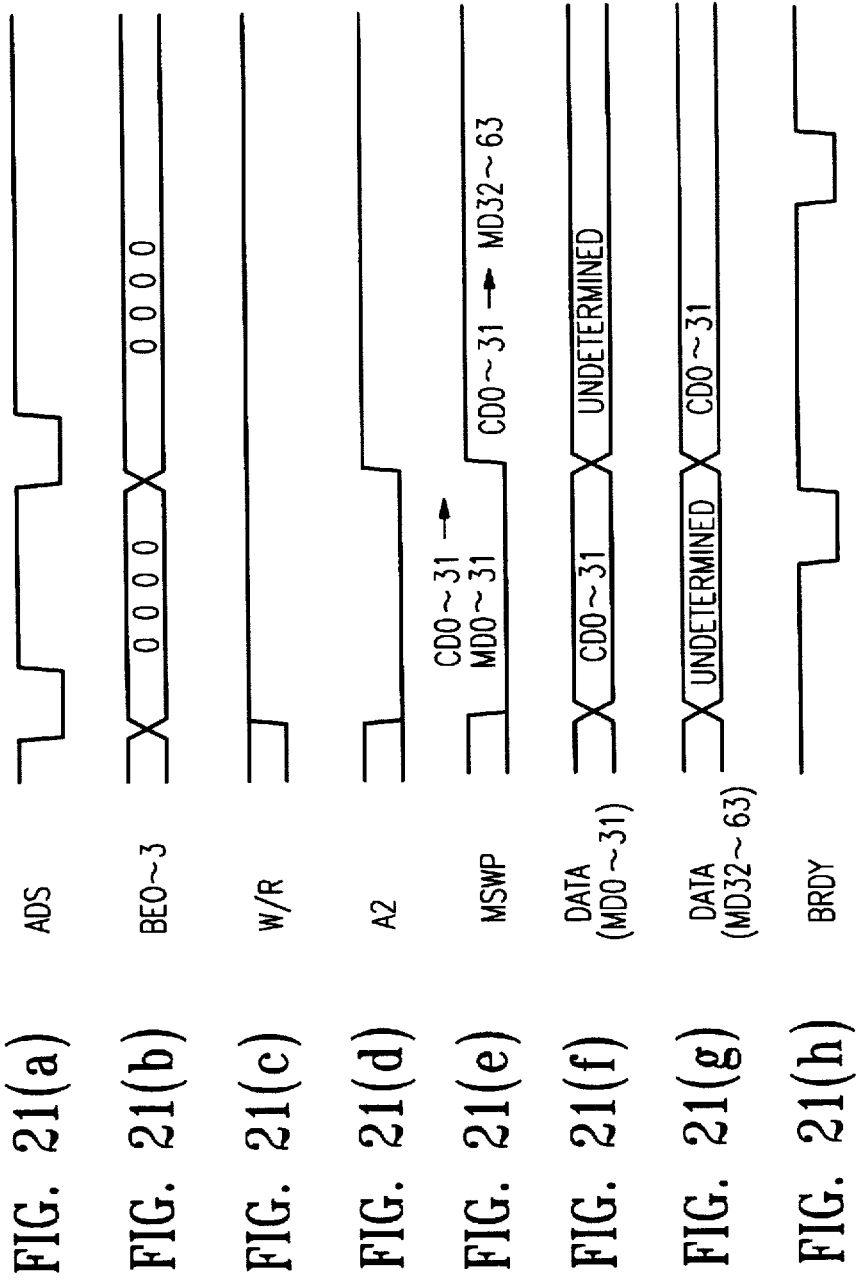
FIGS. 21(a)–(h) shows a timing chart of a write cycle of writing in a memory in Case 2 of Table 1.

FIG. 21 shows a timing chart of a write cycle of writing in the memory in Case 2. In this embodiment, an operation of writing data having addresses of continuous 64 bits is described. First, the CPU 104 brings down an address status signal ADS (FIG. 21 (a)) indicating the start of a bus cycle to "L" level, outputs a byte enable signal BE0–BE3 (FIG. 21 (b)) and an address A2 (FIG. 21 (d)), and sets a write/read signal W/R to "H" level (write). In response, the timing control section 600 (FIG. 9) brings down a swap signal MSWP (FIG. 21 (e)) to "L" level. Then, the swap circuit 646 transfers the lower 32 bits CD0–CD31 on the processor data bus 306 to the lower 32 bits MD0–MD31 of the memory data bus 310. It is noted that at this moment, a memory control section 612 outputs a row address strobe signal (RAS1), and a column address strobe signal CAS and a write enable signal WE (not shown) to the RAMs 208a and 208b to thereby execute data writing operation.

When 32-bit data is transferred once, a burst ready signal BRDY (FIG. 21 (h)) is supplied from the memory controller 202 to the CPU 104, and the CPU 104 outputs a next 32-bit data. In the second write cycle, the swap signal MSWP (FIG. 21 (e)) is set to "H" level, and therefore the swap circuit 646 transfers data of the lower 32 bits CD0–CD31 on the processor data bus 306 to the upper 32 bits MD32–MD63 of the memory data bus 310.

As understood from the above, in Case 2 where the 32-bit CPU 104 and the expanded RAM 210 are installed, the effective 32 bits on the processor data bus 306 are transferred to one of the upper 32 bits and the lower 32 bits of the memory data bus 310 by the swap circuit 646. Where not all bits of 32-bit data on the processor data bus 306 are effective, but a part of bytes is effective, the swap circuit 646 transfers effective bytes on the processor data bus 306 to proper bus lines on the memory data bus 310. Therefore, a circuit that executes data transfer between the processor data bus 306 and the memory data bus 310 in response to the lower address (an 8-bit byte enable signal EB0'–BE7' or an address A2 and a 4-bit enable signal BE0'–BE3'), such as the swap circuit 646, can be used.

In Case 3 shown in Table 4 (64-bit CPU+Internal RAM only as shown in FIG. 19), by the operation of the swap circuit 646, 64-bit data on the processor bus 306 is transferred in two divided sections to the upper 32-bit MD32–MD63 on the memory data bus 310. Since this operation is generally the same as the one described above with reference to FIG. 15 (data transfer cycle from the 64-bit CPU to the input-output data bus), the explanation of the operation is omitted.

In Case 4 (32-bit CPU+Internal ROM only as shown in FIG. 20), by the operation of the swap circuit 646, data of the lower 32 bits CD0–CD31 on the processor data bus 306 is transferred to the upper 32 bits of the memory data bus 310 as it is. This operation is generally the same as the one described above with reference to FIG. 16 (data transfer cycle from the 32-bit CPU to the input-output data bus) except that the address status signal ADS' is changed to ADSM and the burst ready signal BRDY' is changed to BRDYM. Therefore, the description the operation is omitted.

As described above, in an ordinary data write cycle from the CPU to the memory, effective bytes on the processor data bus 306 are transferred to appropriate bus lines of the memory data bus 310 by the swap circuit 646. It is noted, as shown in FIG. 13, that the different row address strobe signals RAS1 and RAS0 are provided to the internal RAMs 208a, 208b and the expanded RAMs 210a, 210b, respectively, so that effective data are written in the respective RAMs in response to the strobe signals RAS1 and RAS0.

Read operations from the memory to the CPU in the above described four cases are summarized in Table 5 below.

TABLE 5

| CPU<br>RAM | 64-bit CPU | 32-bit CPU |
|---|---|---|
| Internal RAM +<br>Expanded<br>RAM<br>(8 MB) | Case 1 (FIG. 13)<br>64 bits on the memory<br>data bus are outputted<br>as 64 bits on the<br>processor data bus. | Case 2 (FIG. 14)<br>Upper 32 bits and lower<br>32 bits on the memory<br>data bus are outputted<br>as lower 32 bits on the<br>processor data bus. |
| Internal RAM<br>only<br>(4 MB) | Case 3 (FIG. 19)<br>upper 32 bits on the<br>memory data bus are<br>latched in the upper and<br>lower latches, and<br>outputted as 64 bits on<br>the processor data bus. | Case 4 (FIG. 20)<br>Upper 32 bits on the<br>memory data bus are<br>outputted as lower<br>32 bits on the processor<br>data bus. |

In Case 1 shown in Table 5 (64-bit CPU+Expanded RAM as shown in FIG. 13), the processor data bus 306 and the memory data bus 310 are driven with all the 64 bits being effective. Therefore, data on the memory data bus 310 is transferred to the processor data bus 306 as it is. Accordingly, 64-bit data passes through the swap circuit 648, maintained by two latch circuits 650 and 652 in two sections each having 32 bits, and then outputted to the processor data bus 306.

In Case 2 shown in Table 5 (32-bit CPU+Expanded RAM as shown in FIG. 14), 32-bit data read out from the RAMs is outputted as the upper 32 bits or the lower 32 bits on the memory data bus 310. The processor data bus 306 is driven with the lower 32 bits being effective. Accordingly, the swap circuit 648 allows one of the upper 32 bits and the lower 32 bits on the memory data bus 310 to be outputted as the lower 32 bits of the processor data bus 306.

Figure 22:
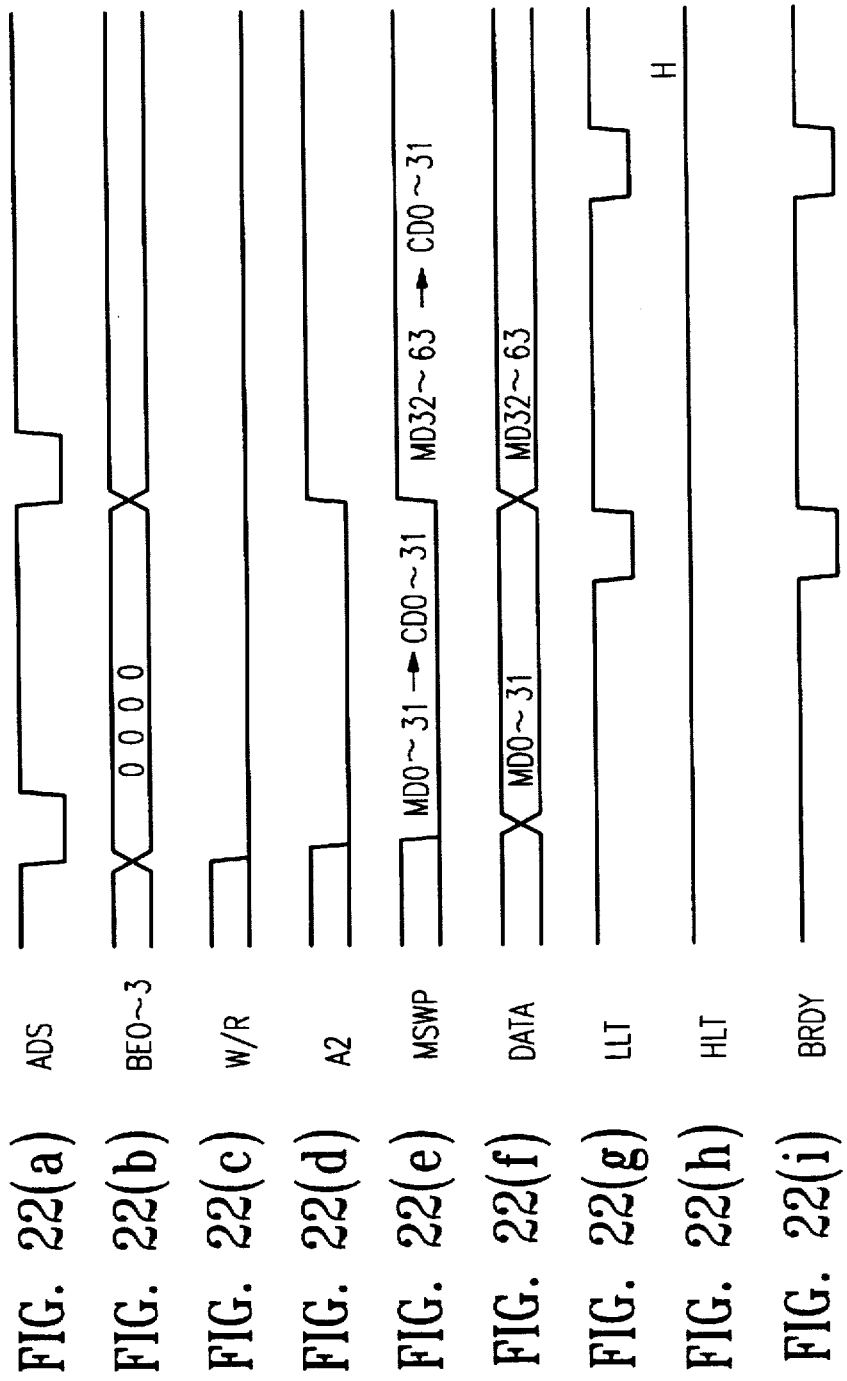
FIGS. 22(a)–(i) shows a timing chart of a read cycle of reading from a memory in Case 2 of Table 2.

FIG. 22 shows a timing chart of a read cycle of reading from the memory in Case 2. In this embodiment, an operation of reading data having continuous 64 bits is described. First, the CPU 104 brings down an address status signal ADS (FIG. 22 (a)) indicating the start of a bus cycle to "L" level, outputs a byte enable signal BE0–BE3 (FIG. 22 (b)) and an address A2 (FIG. 22 (d)), and sets a write/read signal W/R (FIG. 22 (c)) to "L" level (read). In response, the timing control section 600 (FIG. 9) brings down a swap signal MSWP (FIG. 22 (e)) to "L" level. Then, the swap circuit 648 transfers the lower 32 bits MD0–MD31 on the memory data bus 310 to the lower side latch circuit 652. When a latch signal LLT (FIG. 22 (g)) is provided to the latch circuit 652, the 32-bit data is maintained and outputted as the lower 32 bits CD0–CD31 on the processor data bus 306.

When data of 32 bits is transferred once, a burst ready signal BRDY (FIG. 22 (i)) is sent from the memory controller 202 to the CPU 104. In response thereto, the CPU 104 starts a second reading cycle. When the second cycle pertains to a cycle of reading data having continuous addresses, the swap signal MSWP (FIG. 22 (e)) is set to "H" level. Accordingly, the swap circuit 648 transfers the upper 32 bits MD32–MD63 on the memory data bus 310 to the lower 32 bits CD0–CD31 on the processor data bus 306.

As described above, when the 32-bit CPU 104 and the expanded RAM 210 are installed, the effective 32 bits on the memory data bus 310 are transferred as the lower 32 bits of the processor data bus 306 by the swap circuit 648.

Where not all bits of 32-bit data on the processor data bus 310 are effective, but a part of bytes is effective, the swap circuit 648 has a function of transferring effective bytes on the memory data bus 310 to proper bus lines on the processor data bus 306. Therefore, as the swap circuit 646, a circuit can be used that executes data transfer between the processor data bus 306 and the memory data bus 310 in response to the lower address (an address A2 and a 4-bit enable signal BE0'–BE3', or an 8-bit byte enable signal EB0'–BE7').

In Case 3 shown in Table 5 (64-bit CPU+Internal RAM only as shown in FIG. 19), by the operation of the swap circuit 648, data of the upper 32 bits on the memory data bus 310 is allocated to and maintained by the upper side latch circuit 650 and the lower side latch circuit 652. Data of 64 bits maintained by the two latch circuits 650 and 652 are simultaneously outputted to the processor data bus 306. Since this operation is generally the same as the one described above with reference to FIG. 17 (data transfer cycle from the input-output data bus to the 64-bit CPU), the description of the operation is omitted.

In Case 4 shown in Table 5 (32-bit CPU+Internal RAM only as shown in FIG. 20), data of the upper 32 bits on the memory data bus 310 is transferred as the lower 32 bits on the processor data bus 306. Since this operation is generally the same as the one described with reference to FIG. 18 (data transfer cycle from the input-output data bus to the 32-bit CPU), the description of the operation is omitted.

As described above, in an ordinary data write cycle of writing data from the memory to the CPU, effective bytes on the memory data bus 310 are transferred to appropriate bus lines of the processor data bus 306 by the operation of the swap circuit 648 and the latch circuits 650 and 652.

The memory controller 202 determines which one of the above cases is applicable to a given computer structure in response to the module determination signal det provided from the terminal of the CPU module and the memory determination signal Mdet provided from the terminal of the expanded RAM, and provides an appropriate signal to the bus conversion section 200. Therefore, the memory controller 202 and the bus conversion section 200 can execute an appropriate data transfer in accordance with the data bus width of the CPU and the capacity of the RAM.

In accordance with the embodiments described above, a CPU and a CPU module having only connectors are replaced. As a result, CPUs having different bus widths are readily replaced with another. This type of module has various advantages, such as for example, a simple structure, reduced volume and surface area, and reduced cost, as compared with modules equipped with a power source for a particular CPU and a bus conversion circuit. In particular, in a mobile type information processing apparatus such as a notebook-size personal computer, a replacement module for a CPU cannot have a large volume or a large surface area. However, the present invention is advantageous in this respect because a small module having a CPU can be replaced. Moreover, there is an advantage in that it is easier to replace a smaller module.

The bus conversion section 200 shown in FIG. 8 executes a bus conversion that is appropriate to the bus width of the installed CPU. As a result, a CPU having a different bus width can be replaced without lowering the processing power of the CPU. In this case, the bus conversion section 200 appropriate to the CPU is not required to be installed within the module.

Furthermore, where a CPU and connectors are formed in a module, a small package, such as TCP (tape carrier package), QFP (quad-flat package) and the like, can be used. As a result, the module can be made small.

It should be noted that the present invention is not limited to the embodiments described above, and can be implemented in various embodiments as long as such embodiments do not deviate from the scope of the subject matter. For example, the following modifications are possible.

(1) The present invention is applicable to a data bus width other than the 32-bit bus width and the 64-bit bus width for the first CPU 104 and the second CPU 124. However, the data bus width of the second CPU 124 is preferably an even number of times as wide as the data bus width of the first CPU 104. As a result, the control of the swap circuits 622, 646 and 648 is simplified.

[0117]

(2) In the embodiments described above, the status signals ST0 and ST1 (FIG. 6) are used for setting a voltage level proper to an installed CPU module, and the module determination signal det (which is different from the status signals) is used for indicating the data bus width of an installed CPU. However, the status signals (or the determination signal) can be used for both purposes.

(3) In the embodiments described above, terminals for generating the determination signals det, Mdet and Cdet are provided at the connectors of each module. However, circuits for generating various determination signals may be provided at places other than the connectors. However, there are advantages in providing determination terminals at the connector because determination signals proper to the installed module are then generated without an error.

Figure 23:
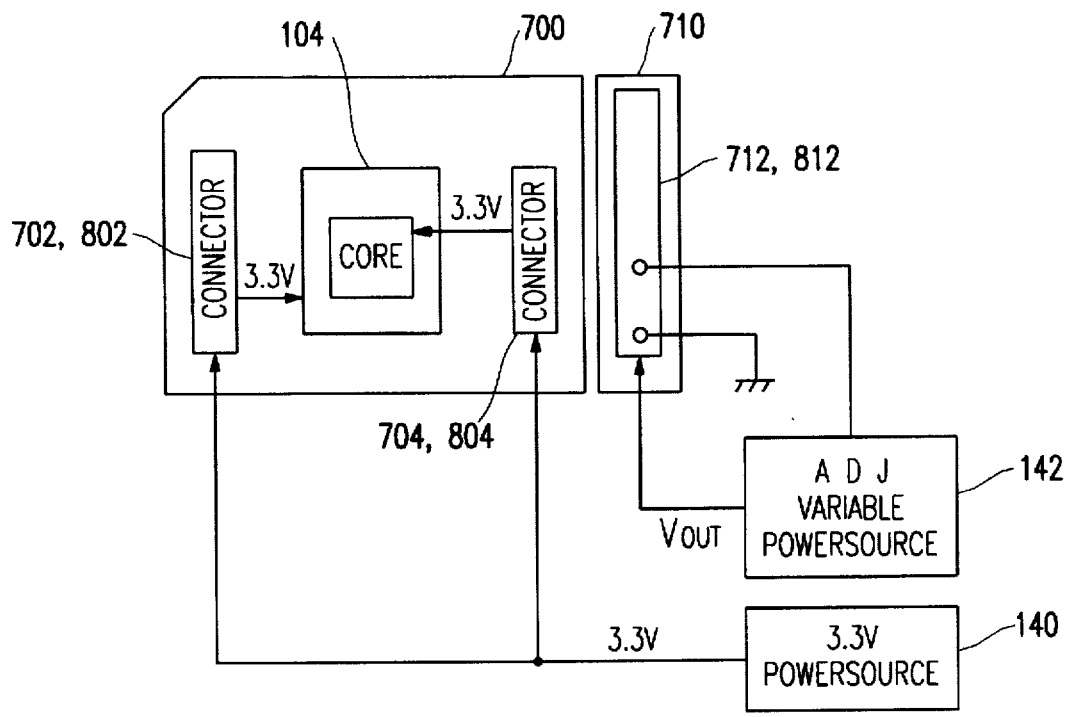
FIG. 23 shows a method of supplying power to a 32-bit CPU in accordance with another embodiment of the present invention.

(4) FIG. 23 is a view showing a power supply to a 32-bit CPU in accordance with another embodiment of the present invention. A CPU module 700 has a 32-bit CPU 104 and two connectors 702 and 704. The connector 702 is an 80-pin connector and the connector 704 is a 60-pin connector, and they are connected to associated connectors 802 and 804 on the system board, respectively. A bus connector board 710 having a connector 712 is provided adjacent to the CPU module 700 and is coupled to a third connector 812 on the system board. The connector 812 is a 100-pin connector that has terminals for the second 60-pin connector 804 and signal lines for a 64-bit CPU (bus D0–D63, byte enable BE0–BE7, and the like). A constant voltage power source 140 provides a constant voltage of 3.3 V to the first connector 802 and the second connector 804. The first connector 702 of the CPU module 700 is used to supply the voltage of 3.3 V that is provided through the connector 802 on the system board to the peripheral circuit section of the CPU 104. The second connector 704 of the CPU module 700 is used to supply the power of 3.3 V that is provided through the connector 804 on the system board to the core section of the CPU 104. The third connector 812 on the system board is provided with an output from the variable power source 142. However, when the first CPU module 700 is installed, the output from the variable power source 142 is not provided to the CPU.

Figure 24:
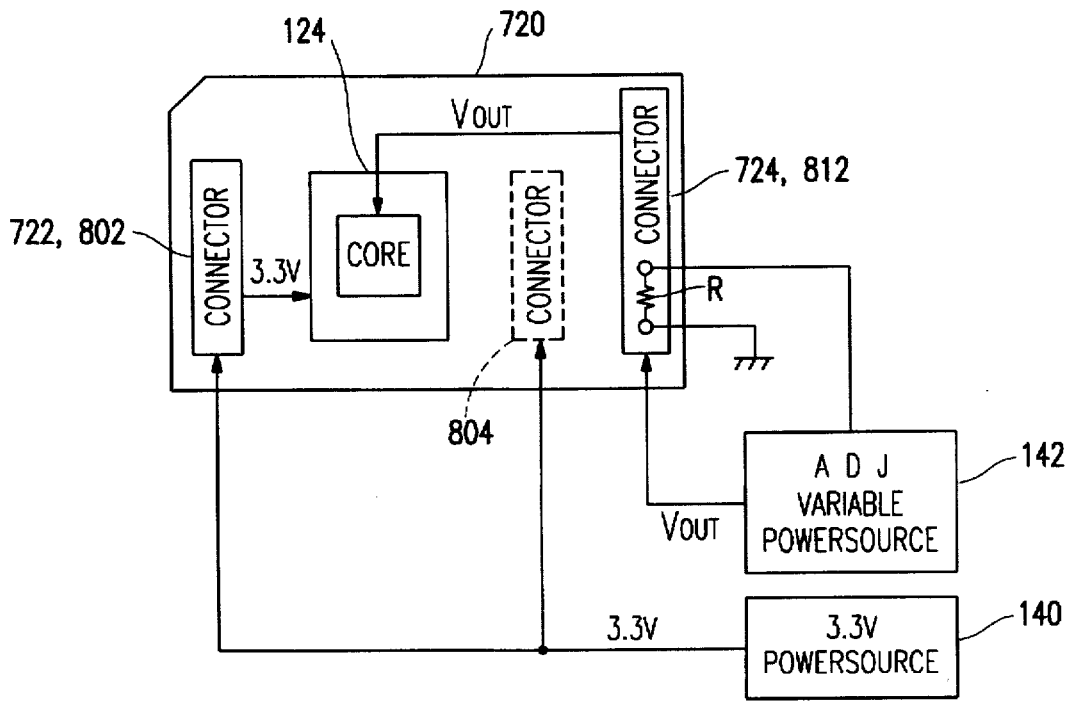
FIG. 24 shows a method of supplying power to a 64-bit CPU in accordance with another embodiment of the present invention.

FIG. 24 shows an embodiment where a second CPU module 720 is installed. The CPU module 720 shown in FIG. 24 has a 64-bit CPU 124 and two connectors 722 and 724. The first connector 722 is connected to a first connector 802 on the system board. The second connector 724 of the CPU module 720 is coupled to a third connector 812 on the system board. The second connector 804 on the system board is not connected to anywhere. The first connector 722 of the second CPU module 720 is used to supply the voltage of 3.3 V, that is provided through the connector 802 on the system board, to the peripheral circuit section of the CPU 124, in a similar manner as shown in FIG. 23. On the other hand, the second connector 724 of the second CPU module 720 is used to supply an output from the variable power source 142, that is provided through the third connector 812 on the system board, to the core section of the CPU 124. It is noted that the connector 724 is connected to a feedback resistor R that adjusts an output voltage $V_{out}$ of the variable power source 142.

As described above, a constant voltage is supplied through the common connector 802 to the peripheral circuit section of the CPU, and a different voltage can be supplied to the core section of a CPU by using a different connector in accordance with the CPU. In particular, the third connector 812 is connected to an output from the variable power source 142, and the output voltage $V_{out}$ is adjusted in accordance with the value of the feedback resistor R that is connected to the connector 812. Accordingly, when a newly installed CPU requires a voltage level different from a previous CPU, a voltage proper to the new CPU can be supplied. Further, in the embodiments shown in FIG. 23 and FIG. 24, either of the CPU modules is connected to the system board through the two connectors. As a result, the alignment of the module is simplified over a case in which a CPU module is connected to the system board, using three or more connectors.

Figure 25:
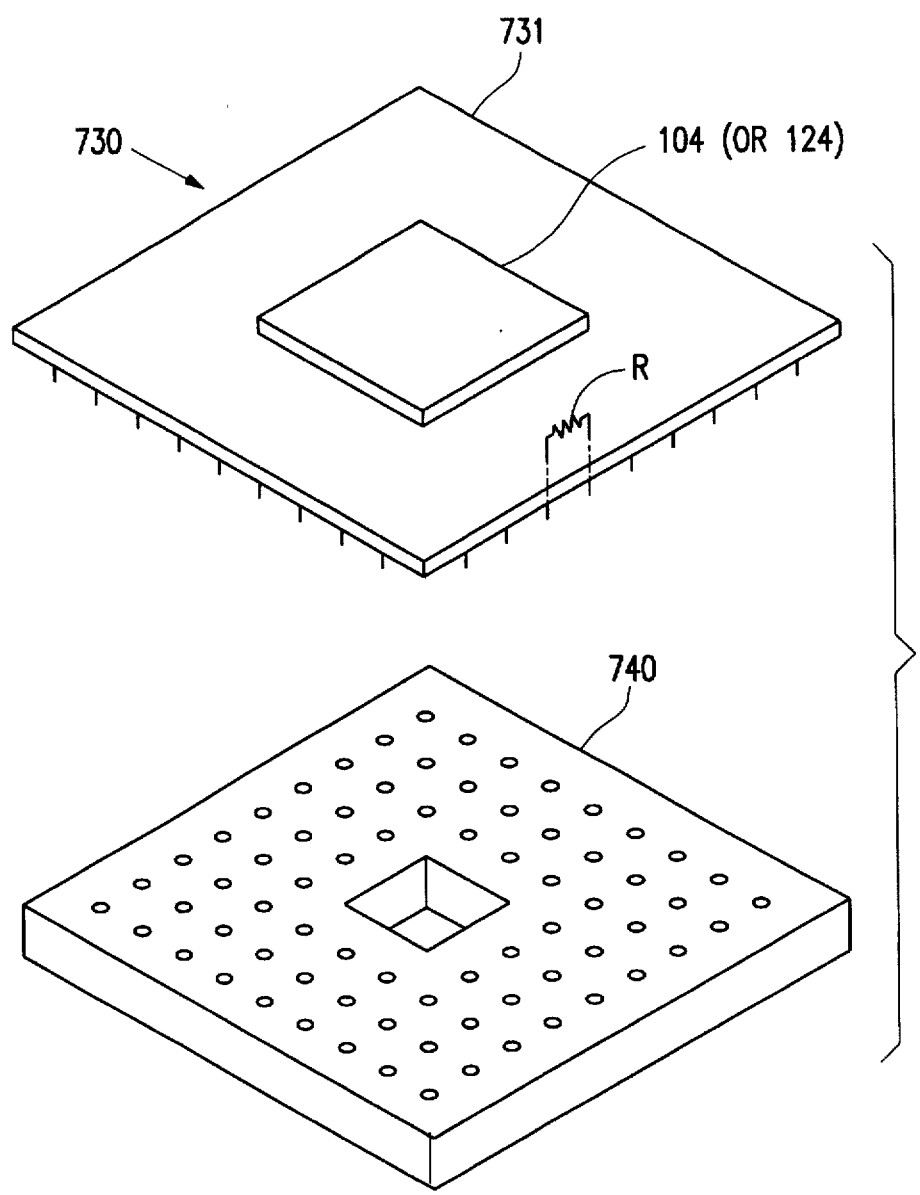
FIG. 25 schematically shows a CPU module in accordance with another embodiment of the present invention.

(5) FIG. 25 schematically shows the structure of a CPU module in accordance with another embodiment of the present invention. A CPU module 730 has a CPU 104 (or 124), and a feedback resistor R that is connected to a feedback terminal of a variable power source 142 (FIG. 24) disposed on a multi-layered substrate 731. The system board is provided with a PGA (Pin Grid Array) socket 740 that is coupled to the CPU module 730. A plurality of male connectors that are inserted in the PGA socket 740 are provided at the lower side of the multi-layered substrate 731. The multi-layered substrate 731 has a wiring layer in which a wiring pattern is formed for connecting lead wires of a QFP type CPU or a TCP type CPU and the male connectors for the PGA socket. The PGA socket 740 is provided with numerous terminals. The terminals are divided into groups of terminals that are selectively used by different CPU modules. For example, arrangements may be made so that all the terminals of the PGA socket 740 are used when the 64-bit CPU 124 is installed, and only a predetermined group of terminals adjacent the center of the PGA socket 740 is used when the 32-bit CPU 104 is installed. It is noted that a voltage supplied to an installed CPU can be adjusted by changing the value of the feedback resistor R shown in FIG. 25 in accordance with the installed CPU. It is also noted that, in the embodiment shown in FIG. 25, status signal terminals ST0 and ST1 shown in FIG. 6 may be provided instead of the feedback resistor R.

In this manner, a single socket (connector) on the system board provides a structure similar to the one that is achieved by providing a plurality of connectors shown in FIG. 1, FIG. 2, FIG. 23 and FIG. 24. In other words, the system board may be provided with at least one connector for connecting to a CPU module. A first group of terminals commonly used for each CPU and a second group of terminals exclusively used for a 64-bit CPU may be provided at the connector. Also, it is noted that the connector may have a group of terminals that is exclusively used for a 32-bit CPU.

Figure 26:
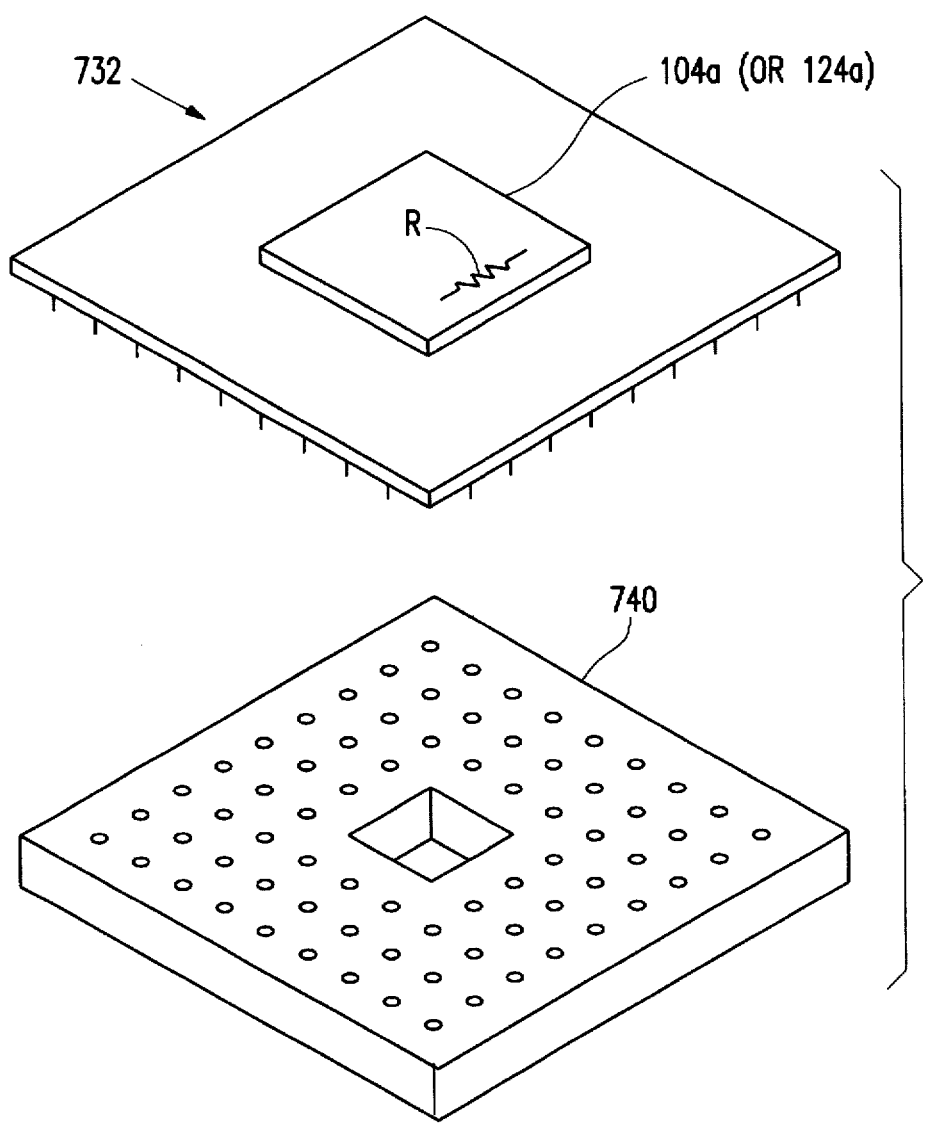
FIG. 26 schematically shows a CPU module in accordance with a still further embodiment of the present invention.

FIG. 26 schematically shows the structure of a CPU module in accordance with a further embodiment of the present invention. A CPU module 732 uses a 32-bit CPU 104a (or a 64-bit CPU 124a) that internally has a feedback resistor R. It is noted that the use of a CPU having an internal feedback resistor R eliminates the necessity of providing a feedback resistor on a substrate. Furthermore, instead of using a CPU module in which a CPU is provided on a printed substrate, a single unit of a PGA type CPU may be installed by means of a socket.

As described above, in accordance with a data processing apparatus as set forth in claims 1 and 11 of the present invention, a voltage adjusting device adjusts an output voltage from a variable power source depending upon an installed CPU module. Accordingly, a voltage proper to the installed CPU module is supplied.

In accordance with a data processing apparatus of another embodiment, a different voltage is readily supplied when a CPU requires a different voltage to be supplied to its core section.

In accordance with a data processing apparatus of yet another embodiment, by changing the value of a feedback resistor that is connected to a feedback terminal of a variable power source, an output voltage is adjusted to a value proper to an installed CPU module.

In accordance with a data processing apparatus of yet another embodiment, one of a lower address outputted from an installed CPU module and a lower address outputted from a lower address conversion device is selected in response to a module determination signal. As a consequence, a lower address that is proper to the installed CPU module is generated.

In accordance with a data processing apparatus of yet another embodiment, an input-output bus conversion device performs a bus conversion in a mode proper to an installed CPU module between a processor data bus and an input-output data bus in response to a module determination signal.

In accordance with a data processing apparatus of yet another embodiment, a bus conversion between a processor data bus and a memory data bus is performed in response to a module determination signal and a memory determination signal in a mode proper to an installed CPU module and an installed memory.

In accordance with a data processing apparatus of yet another embodiment, an operation proper to an installed CPU module is performed in accordance with the connection status of a second connector.

What is claimed is:

1. A data processing apparatus capable of coupling to one of a first CPU module having a first data bus width and a second CPU module having a second data bus width, the second bus width being wider than the first data bus width, the first CPU module having a first set of terminals, the second CPU module having a second set of terminals, the second set of terminals including a plurality of terminals having one-to-one spatial correspondence with the first set of terminals and a plurality of additional terminals, the data processing apparatus comprising:

a first group of terminals for receiving the first set of terminals of the first CPU module and the terminals of the second CPU module having one-to-one spatial correspondence with the first terminals;

a second group of terminals for receiving the plurality of additional terminals of the second CPU module;

a variable power source for adjusting an output voltage to be supplied to an installed CPU module through at least one of the first and the second group of terminals; and a voltage adjusting device coupled to the variable power source for adjusting the output voltage of the variable power source in response to the installation of one of the first CPU module and the second CPU module.

2. A data processing apparatus as defined in claim 1, wherein the second data bus width is twice the first data bus width.

3. A data processing apparatus as defined in claim 1, wherein the voltage adjusting device includes:

a plurality of feedback resistors;

a switch for selecting and coupling at least one of the plurality of feedback resistors to the feedback terminal of the variable power source; and a switch driving device for coupling the one of the plurality of feedback resistors to the feedback terminal by manipulating the switch in response to a signal provided by an installed CPU module.

4. A data processing apparatus as defined in claim 3, wherein the second data bus width is twice the first data bus width.

5. A data processing apparatus as defined in claim 1, wherein the voltage adjusting device has a circuit that couples a feedback resistor provided in an installed CPU module to a feedback terminal of the variable power source.

6. A data processing apparatus as defined in claim 5, wherein the second data bus width is twice the first data bus width.

7. A data processing apparatus as defined in claim 5, wherein the voltage adjusting device includes:

a plurality of feedback resistors;

a switch for selecting and coupling least one of the plurality of feedback resistors to the feedback terminal of the variable power source; and a switch driving device for coupling the one of the plurality of feedback resistors to the feedback terminal by manipulating the switch in response to a signal provided by an installed CPU module.

8. A data processing apparatus as defined in claim 7, wherein the second data bus width is twice the first data bus width.

9. A data processing apparatus as defined in claim 1, the data processing apparatus further comprising:

a third group of terminals capable of coupling to a bus of the first CPU module; and a constant voltage power source for supplying a specified voltage to peripheral circuits of an installed CPU through the first group of terminals, the constant voltage power source being capable of supplying the specified voltage to a CPU core section of an installed first CPU module through the third group of terminals, wherein the variable power source is capable of supplying an output voltage to a CPU core section of an installed second CPU module through the second group of terminals.

10. A data processing apparatus as defined in claim 9, wherein the second data bus width is twice the first data bus width.

11. A data processing apparatus as defined in claim 9, wherein the voltage adjusting device includes:

a plurality of feedback resistors;

a switch for selecting and coupling at least one of the plurality of feedback resistors to the feedback terminal of the variable power source; and a switch driving device for coupling the one of the plurality of feedback resistors to the feedback terminal by manipulating the switch in response to a signal provided by the installed CPU module.

12. A data processing apparatus as defined in claim 11, wherein the second data bus width is twice the first data bus width.

13. A data processing apparatus as defined in claim 9, wherein the voltage adjusting device includes a circuit for coupling a feedback resistor provided in the installed CPU module to a feedback terminal of the variable power source.

14. A data processing apparatus as defined in claim 13, wherein the second data bus width is twice the first data bus width.

15. A data processing apparatus as defined in claim 13, wherein the voltage adjusting device includes:

a plurality of feedback resistors;

a switch for selecting and coupling at least one of the plurality of feedback resistors to the feedback terminal of the variable power source; and a switch driving device for coupling the one of the plurality of feedback resistors to the feedback terminal by manipulating the switch in response to a signal provided by the installed CPU module.

16. A data processing apparatus as defined in claim 15, wherein the second data bus width is twice the first data bus width.

17. A data processing apparatus capable of coupling to one of a first CPU module having a first data bus width and a second CPU module having a second data bus width, the second bus width being wider than the first data bus width, the first CPU module having a first set of terminals, the second CPU module having a second set of terminals including a plurality of terminals having one-to-one spatial correspondence with the first set of terminals and a plurality of additional terminals, the data processing apparatus comprising:

a first group of terminal for receiving the first set of terminals of the first CPU module and the terminals of the second CPU module having one-to-one spatial correspondence with the first terminals;

a second group of terminals capable of coupling to a bus of the second CPU module through the plurality of additional terminals;

a processor data bus having a bus width that is the same as the second data bus width capable of coupling to an installed CPU through at least the second group of terminals;

a module determination signal generating device for generating a module determination signal representing which one of the first CPU module and the second CPU module is installed;

a lower address conversion device for converting a lower address outputted from the second CPU module, the lower address representing which bytes are effective on the processor data bus, into a signal equivalent to a lower address to be outputted from the first CPU module; and a selection device for selecting one of a lower address outputted from an installed CPU module and a lower address outputted from the lower address conversion device in response to the module determination signal.

18. A data processing apparatus as defined in claim 17, wherein the second data bus width is twice the first data bus width.

19. A data processing apparatus as defined in claim 17, wherein the module determination signal generating device includes a module determination terminal for changing the module determination signal based upon a connection state of the second group of terminals.

20. A data processing apparatus as defined in claim 19, wherein the second data bus width is twice the first data bus width.

21. A data processing apparatus capable of coupling to one of a first CPU module having a first data bus width and a second CPU module having a second data bus width that is wider than the first data bus width, the first CPU module having a first set of terminals, the second CPU module having a second set of terminals, the data processing apparatus comprising:

a first group of terminals for receiving the first set of terminals of the first CPU module and the second set of terminals of the second CPU module;

a second group of terminals capable of coupling to a bus of the second CPU module;

a processor data bus having a bus width that is the same as the second data bus width and is capable of coupling to a data bus of an installed CPU through at least the second group of terminals;

a module determination signal generating device for generating a module determination signal representing which one of the first CPU module and the second CPU module is installed;

an input-output data bus having a data bus width that is the same as the first data bus width; and an input-output bus conversion device for converting signals between the data bus of the installed CPU module and the input-output data bus in response to the module determination signal, wherein the input-output bus conversion device transfers data on memory cycles and includes:

an output conversion device for providing a first bus width of data on the data bus of the first CPU module to the input-output data bus on a memory cycle when the first CPU module is installed, and for cyclically providing data to the data bus of the second CPU module to the input-output data bus by sequentially selecting portions of a second bus width of data on the data bus of the second CPU module on memory cycles and outputting selected data to the bus line to the input-output data bus; and an input conversion device for providing a first bus width of data on the input-output data bus to the data bus of the first CPU module on a memory cycle when the first CPU module is installed, and for combining portions of data inputted on memory cycles to the input-output data bus to form a combined portion of data and outputting the combined portion of data to the data bus of the second CPU module when the second CPU module is installed.

22. A data processing apparatus as defined in claim 21, wherein the second data bus width is twice the first data bus width.

23. A data processing apparatus as defined in claim 21, wherein the module determination signal generating device includes a module determination terminal for changing the module determination signal in response to a connection state of the second group of terminals.

24. A data processing apparatus as defined in claim 23, wherein the second data bus width is twice the first data bus width.

25. A data processing apparatus as defined in claim 21, wherein the output conversion device includes a swap circuit for inputting data on the effective bus lines to the input-output data bus in response to a lower address representing effective bus lines on the processor data bus, and the input conversion device includes a plurality of latch circuits for receiving corresponding portions of data inputted on memory cycles to the input-output data bus.

26. A data processing apparatus as defined in claim 25, wherein the second data bus width is twice the first data bus width.

27. A data processing apparatus as defined in claim 25, wherein the module determination signal generating device includes a module determination terminal for changing the module determination signal in response to a connection state of the second group of terminals.

28. A data processing apparatus as defined in claim 27, wherein the second data bus width is twice the first data bus width.

29. A data processing apparatus capable of coupling to one of a first CPU module having a first data bus width and a second CPU module having a second data bus width that is wider than the first data bus width, the data processing apparatus comprising:

a first group of terminals for receiving one of the first CPU module and the second CPU module;

a second group of terminals for receiving the second CPU module;

a processor data bus having a bus width that is the same as the second data bus width and being coupled to a data bus of an installed CPU through at least the second group of terminals;

a module determination signal generating device for generating a module determination signal representing which one of the first CPU module and the second CPU module is installed;

a third group of terminals receiving an expanded memory having a bus width equal to the first data bus width;

an internal memory having a bus width equal to the first data bus width;

a memory data bus having a first bus line and a second bus line, each having a bus width equal to the first data bus width, the memory data bus being coupled to the internal memory through the first bus line and being capable of coupling to the expanded memory through the second bus line and the third group of terminals;

a memory determination signal generating device for generating a memory determination signal representing whether the expanded memory is installed; and a memory bus conversion device for converting data transferred between the data bus of the installed CPU and the memory data bus in response to the module determination signal and the memory determination signal;

wherein the memory conversion device includes:

an output conversion device for selecting one of the first bus line and the second bus line of the memory data bus and for outputting data on the data bus of the first CPU module when the first CPU module is installed, for outputting a second bus width of data on the data bus of the second CPU module to the memory data bus when the second CPU module and the expanded memory are installed, and for outputting portions of the second bus width of data on the data bus of the second CPU module to the memory data bus on memory cycles by sequentially selecting and outputting data on a corresponding selected bus line to the first bus line of the memory data bus; and an input conversion device for inputting data read from one of the internal memory and the expanded memory into one of the first and the second bus line of the memory data bus to the data bus of the first CPU module when the first CPU module is installed, for inputting a second bus width of data on the memory data bus to the data bus of the second CPU module when the second CPU module and the expanded memory are installed, and for combining portions of a second bus width of data read out on memory cycles from the internal memory to the bus line of the memory data bus and providing the combined portions of data to the data bus of the second CPU module when the second CPU module is installed and the expanded memory is not installed.

30. A data processing apparatus as defined in claim 29, wherein the second data bus width is twice the first data bus width.

31. A data processing apparatus as defined in claim 29, wherein the module determination signal generating device includes a module determination terminal for changing the module determination signal in response to a connection state of the second group of terminals.

32. A data processing apparatus as defined in claim 31, wherein the second data bus width is twice the first data bus width.

33. A data processing apparatus as defined in claim 29, wherein the output conversion device includes a swap circuit for outputting data on the effective bus lines to the memory data bus in response to a lower address representing effective bus lines on the processor data bus; and the input conversion device includes a plurality of latch circuits for combining the portions of the second bus width of data inputted on memory cycles to the memory data bus.

34. A data processing apparatus as defined in claim 33, wherein the second data bus width is twice the first data bus width.

35. A data processing apparatus as defined in claim 33, wherein the module determination signal generating device includes a module determination terminal for changing the module determination signal in response to a connection state of the second group of terminals.

36. A data processing apparatus as defined in claim 35, wherein the second data bus width is twice the first data bus width.

* * * * *